(12) United States Patent
Ishikawa

(10) Patent No.: US 7,660,476 B2
(45) Date of Patent: Feb. 9, 2010

(54) IMAGE PROCESSING METHOD AND IMAGE PROCESSING APPARATUS

(75) Inventor: Tomoe Ishikawa, Sumida-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 11/302,258

(22) Filed: Dec. 14, 2005

(65) Prior Publication Data

US 2006/0140494 A1    Jun. 29, 2006

(30) Foreign Application Priority Data

Dec. 28, 2004    (JP) ............... 2004-381469

(51) Int. Cl.
*G06K 9/36* (2006.01)
*G06K 9/46* (2006.01)

(52) U.S. Cl. .................. 382/240; 382/239

(58) Field of Classification Search ........... None
See application file for complete search history.

(56) References Cited

U.S. PATENT DOCUMENTS

| 7,113,645 B2 * | 9/2006 | Sano et al. ............ 382/240 |
| 2003/0018818 A1 | 1/2003 | Boliek et al. ........... 709/247 |
| 2003/0142871 A1 | 7/2003 | Ishikawa ............... 382/233 |
| 2004/0109197 A1 * | 6/2004 | Gardaz et al. ........... 358/1.15 |
| 2004/0177155 A1 | 9/2004 | Enokida et al. .......... 709/236 |
| 2006/0044601 A1 * | 3/2006 | Misawa et al. ........... 358/1.15 |

FOREIGN PATENT DOCUMENTS

| JP | 2003-023630 | 1/2003 |
| JP | 2003-179760 | 6/2003 |
| JP | 2004-040674 | 2/2004 |

* cited by examiner

*Primary Examiner*—Yuzhen Ge
(74) *Attorney, Agent, or Firm*—Fitzpatrick, Cella, Harper & Scinto

(57) ABSTRACT

There are provided an image processing method and image processing apparatus, which can suitably access a necessary partial image, and can suppress wasteful data transfer by returning data with a small number of tiles for a thumbnail image of a low resolution or the like so as to reduce the number of times of file seek operations, and returning data with a large number of tiles for an image of a high resolution to be returned in response to an enlargement request. To this end, a server encoded data fragmentarily transmits encoded data which is hierarchically encoded by dividing an image into a plurality of tiles in response to a request from a client. The server calculates an occupation ratio of the displayed area of the image requested from the client to the entire image. When the ratio is equal to or lower than a threshold, the server selects encoded data divided to have a larger number of tiles. Otherwise, the server selects encoded data with a smaller number of tiles. The server extracts data corresponding to the displayed area from the selected encoded data, and transmits the extracted data to the client.

17 Claims, 19 Drawing Sheets

NOTE THAT PACKET OF TILE tn, RESOLUTION LEVEL rn, COMPONENT cn, POSITION pn, AND LAYER qn IS REPRESENTED BY PACKET(tn, rn, cn, pn, qn)

PRECINCT DATA-BIN ID OF TILE tn, RESOLUTION LEVEL rn, COMPONENT cn, POSITION pn, AND LAYER qn IS REPRESENTED BY PrID(tn, rn, cn, pn, qn)

FIG. 9

| 0 | 1 | 2 | 3 | 4 | | | 29 | 30 | 31 |
|---|---|---|---|---|---|---|---|---|---|
| 32 | 33 | 34 | 35 | 36 | ......... | | 61 | 62 | 63 |

~901

⋮ ⋮

| 640 | 641 | 642 | 643 | 644 | | | 669 | 670 | 671 |
|---|---|---|---|---|---|---|---|---|---|
| 672 | 673 | 674 | 675 | 676 | ......... | | 701 | 702 | 703 |

↓ CONVERT FOUR TILES INTO ONE TILE

| 0 | 1 | 2 | ............ | 14 | 15 |
|---|---|---|---|---|---|

~902

⋮ ⋮

| 160 | 161 | 162 | ............ | 174 | 175 |
|---|---|---|---|---|---|

IMAGE PROCESSING METHOD AND IMAGE PROCESSING APPARATUS

FIELD OF THE INVENTION

The present invention relates to a technique for transmitting an image which is encoded after being divided into a plurality of tiles, and a technique for changing the number of tiles to be divided of the image as needed.

BACKGROUND OF THE INVENTION

In recent years, the number of pixels to be handled by digital cameras which have prevailed remarkably has become increasingly huge, and general-purpose cameras having, e.g., about two to five million pixels are popular. As digital cameras for professionals, those of 10-million pixel classes are beginning to prevail, and higher resolution will be required in the future.

On another front, users who enjoy uploading images taken with digital cameras to an online album service on the Internet are increasing. In such systems, various types of image browser software are available. In general, a list of thumbnail images is displayed, and the user selects an image to be displayed in an enlarged scale from the list and displays it in a larger scale than the thumbnail image.

However, when image data with a large pixel size which is taken by the aforementioned digital camera in recent years is to be downloaded from a server every time the user selects to display it in an enlarged scale, a very long wait time is required until that image is displayed on a client terminal.

In order to solve such a problem, techniques for saving multi-resolution data, which are encoded by dividing data of respective resolutions into a plurality of tiles, in a server in advance, and downloading and displaying only partial data required upon display of user's choice have been developed. As a typical one of such techniques, a technique that combines Flashpix and IIP, a technique that exploits JPEG2000, and the like are known. That is, according to these techniques, since each image data has a plurality of resolutions, a change in display size at the client can be coped with. Also, since such multi-resolution image data are divided into tiles, the client can randomly access a partial area of an image. Furthermore, by reducing the tile size to be divided, a wasteful transfer data volume can be reduced.

Note that Flashpix is an image file format standardized by Digital imaging group (DIG). Flashpix has multi-resolutions, and an image of each resolution is divided into tiles of 64×64 pixels. Also, IIP is an abbreviation for Internet Imaging protocol, and this protocol allows the client to acquire only required data from Flashpix data by designating the resolution and tiles of the Flashpix data.

Furthermore, as the technique that exploits JPEG2000, one which uses JPEG2000 and JPIP is known. JPEG2000 is an image coding scheme which was standardized in 2001 as an image coding scheme which has multi-resolutions and uses tile division. Note that JPIP is JPEG2000 image coding system-Part 9: Interactivity tools, APIs and protocols, which is being laid down as a protocol required to fragmentarily access and display a file encoded according to JPEG2000.

Also, similar techniques are disclosed in Japanese Patent Laid-Open No. 2003-23630 (U.S. Pre-Grant Publication No. AA2003018818) and Japanese Patent Laid-Open No. 2004-40674.

Japanese Patent Laid-Open No. 2003-23630 discloses a technique associated with a server/client system that exchanges partial data of image data which are stored in a server and are encoded by JPEG2000. According to this technique, there is disclosed the following system. That is, a client requests the server to send partial data of compressed data, which is not stored in a buffer yet, on the basis of information indicating which partial data of a codestream stored in the server has already been stored in the buffer of the client. In response to this request, the server extracts the requested partial data of the compressed data, and returns it to the client. Finally, the client combines the received data and the already stored data to obtain an image.

On the other hand, Japanese Patent Laid-Open No. 2004-40674 discloses a technique for progressively displaying JPEG2000 encoded data stored on the server side at high speed on the client side. According to this technique, a server extracts subband encoded data of a resolution level designated by a client from a file, and transmits it to the client. On the other hand, the client issues a request that designates a desired resolution level to the server, and reconstructs image data by combining coefficients of decoded subbands of the resolution level of the currently displayed image, and those of subbands obtained by decoding the encoded data received from the server, thus implementing progressive display.

However, Flashpix and JPEG2000 mentioned above use largely different tiles. That is, in Flashpix, since the tile size is fixed, i.e., 64×64 pixels at respective resolutions, the number of tiles decreases with decreasing resolution (decreasing image size). By contrast, in JPEG2000, since the numbers of tiles are fixed for respective resolutions, the number of tiles remains the same even when the resolution is lower (the image size is smaller). That is, in order to display an image of 128×128 pixels, Flashpix requires four tiles, and JPEG2000 may often require 100 or more tiles.

On the other hand, the screen resolution on the client side normally ranges from about 320×240 pixels to about 2048×1536 pixels. Upon displaying an image stored in the server on the display screen of the client by an interactive operation, it is often displayed within a window of a viewer of a sort in place of the entire screen. More specifically, an image display area is normally narrower than the screen of a client device. Therefore, when the client wants to display the entire image, it selects an image with a lower resolution, and issues its request to the server; when the client wants to enlarge only a part of an image, it selects an image with a higher resolution, and issues its request to the server.

Note that Japanese Patent Laid-Open No. 2003-179760 discloses a method for generating JPEG2000 encoded data from fragmentarily received data, and decoding the generated data. In such case, the head of each tile is sought and decoded. Therefore, as the number of tiles including areas required in display increases, the number of times of file seek operations increases, resulting in a long decode time.

In JPEG2000, the number of tiles becomes large when the entire image is displayed. For this reason, upon decoding the entire image with a low resolution (small image size), a very long decode time is required although its size is small (resolution is low).

However, both of Japanese Patent Laid-Open Nos. 2003-23630 and 2004-40674 merely describe the technique for exchanging data extracted from JPEG2000 encoded data stored on the server side according to a client request. In the server/client system, a decrease in tile size brings about an effect of reducing a wasteful transfer data volume. However, when the number of tiles of an image is decreased without careful consideration, such data becomes hard to handle in the server/client.

Therefore, a tile division method which shortens the decode time of an image with a low resolution (small image size), and reduces a wasteful transfer data volume is demanded.

SUMMARY OF THE INVENTION

The present invention has been made in consideration of such situation and has as its object to provide an image processing method and image processing apparatus which can suitably access a required partial image and can suppress wasteful data transfer.

In order to achieve the above object, the present invention is characterized by an image processing method comprising:

a calculation step of calculating an occupation ratio of a partial area requested by a transmission destination to an entire image; and a transmission step of transmitting encoded data encoded by dividing the image into a plurality of tiles, wherein the encoding step includes:

transmitting, when the ratio is not more than a predetermined value, encoded data corresponding to the partial area in encoded data obtained by dividing the image to have a first number of tiles; and transmitting, when the ratio is not less than the predetermined value, encoded data corresponding to the partial area in encoded data obtained by dividing the image to have a second number of tiles smaller than the first number of tiles.

Furthermore, in order to achieve the above object, the present invention is characterized by an image processing method comprising:

a calculation step of calculating a size of partial area requested by a transmission destination; and a transmission step of transmitting encoded data encoded by dividing an image into a plurality of tiles, wherein the encoding step includes:

transmitting, when the size is smaller than a reference, encoded data corresponding to the partial area in encoded data obtained by dividing the image to have a first number of tiles; and transmitting, when the size is larger than the reference, encoded data corresponding to the partial area in encoded data obtained by dividing the image to have a second number of tiles smaller than the first number of tiles.

Furthermore, in order to achieve the above object, the present invention is characterized by an image processing method in a server/client system in which a server fragmentarily transmits encoded data which is hierarchically encoded by dividing an image into a plurality of tiles in response to a request from a client, wherein the server comprises:

a reception step of receiving a request to display a predetermined area of the image requested from the client;

an analysis step of analyzing the received request;

a calculation step of calculating an occupation ratio of a displayed area of the image requested from the client to an entire image on the basis of the analysis result of the request;

a generation step of generating second encoded data which is hierarchically encoded by dividing the image to have a second number of tiles, and has a different number of divided tiles from first encoded data which is held by the server and is hierarchically encoded by dividing the image to have a first number of tiles;

a selection step of selecting, when the ratio is not more than a predetermined value, encoded data encoded by dividing the image to have a larger number of tiles of the first and second encoded data, and selecting, when the ratio is not less than the predetermined value, encoded data encoded by dividing the image to have a smaller number of tiles of the first and second encoded data;

an extraction step of extracting encoded data corresponding to the displayed area from the selected encoded data; and a transmission step of transmitting the extracted encoded data to the client.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 9 shows the relationship between tiles and tile numbers of an image held by the server;

DETAILED DESCRIPTION OF THE PREFERRED EMBODIMENTS

Preferred embodiments of an image processing method in a server/client system according to the present invention will be described hereinafter with reference to the accompanying drawings.

First Embodiment

The first embodiment will explain a method in which upon reception of a request from a client, a server which holds a plurality of already generated JPEG2000 files analyzes that request, generates response data according to the request from a designated JPEG2000 encoded image, and transmits the response data to the client.

A case will be described below wherein the user who operates the client opens a given home page on the Internet, displays a thumbnail image according to link information used to acquire a JPEG2000 encoded image displayed there, then displays the entire image, and further displays a partial area of the image in an enlarged scale. In order to attain such image display, the client acquires data from the server using the mechanism of JPIP. Assume that a data transmission unit by JPIP is a packet.

Figure 1:
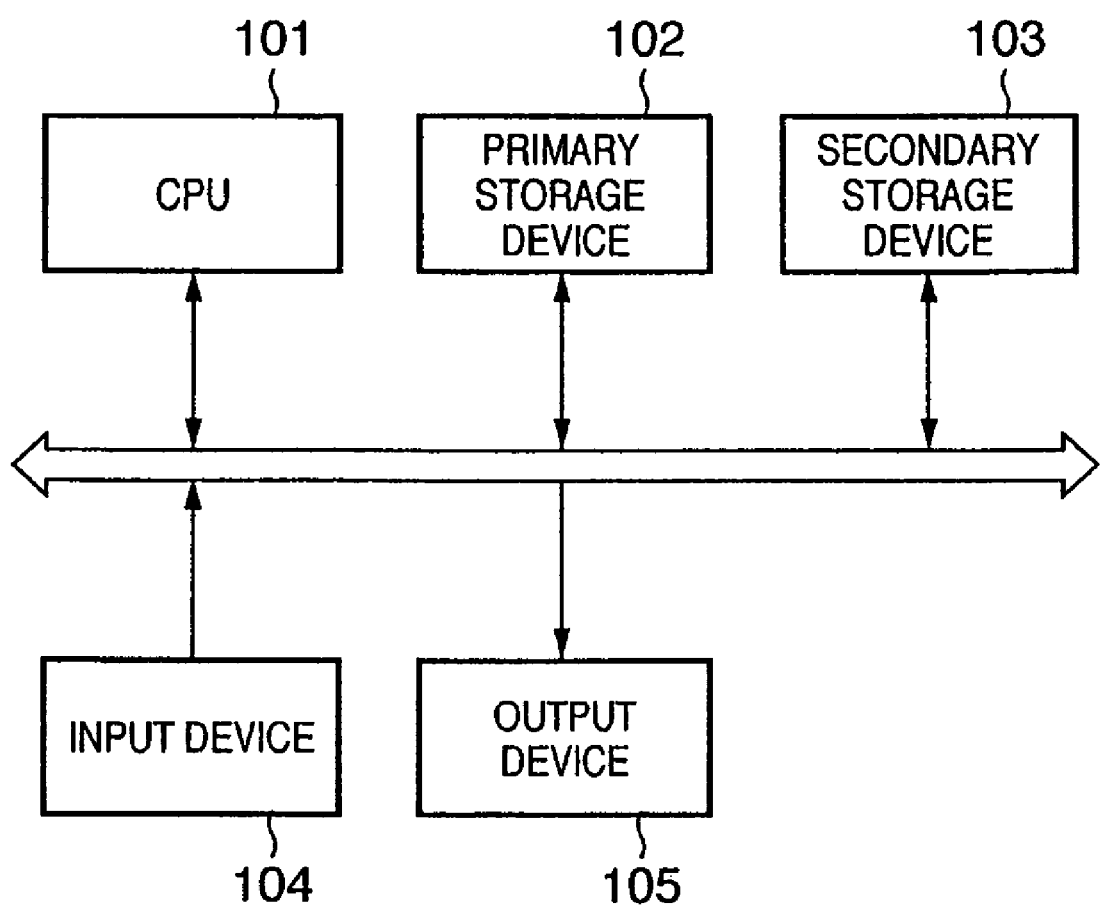
FIG. 1 is a schematic block diagram showing the arrangement of a computer required to implement a server/client system according to the first embodiment of the present invention.

FIG. 1 is a schematic block diagram showing the arrangement of a computer required to implement the server/client system according to the first embodiment of the present invention. Referring to FIG. 1, a CPU 101 controls the operation of the entire system, and executes, e.g., programs stored in a primary storage device 102. The primary storage device 102 is mainly a memory, which loads and stores programs and the like stored in a secondary storage device 103. The secondary storage device 103 corresponds to, e.g., a hard disk or the like. In general, the capacity of the primary storage device 102 is smaller than that of the secondary storage device 103, and programs, data, and the like, which cannot be stored within the primary storage device 102, are stored in the secondary storage device 103. Data and the like, which must be stored for a long period of time, are also stored in the secondary storage device 103. In this embodiment, programs are stored in the secondary storage device 103, and a program is loaded onto the primary storage device 102 and is executed by the CPU 101 when it is executed.

On the other hand, in FIG. 1, an input device 104 corresponds to, e.g., a mouse, keyboard, and the like. That is, the input device 104 is used to make an operation for sending an interrupt signal to, e.g., a program, and the like. Furthermore, an output device 105 corresponds to a monitor, printer, and the like. Note that the configuration method of the computer may have various other modes, but a description thereof will be omitted since it is not the gist of the present invention.

Figure 2:
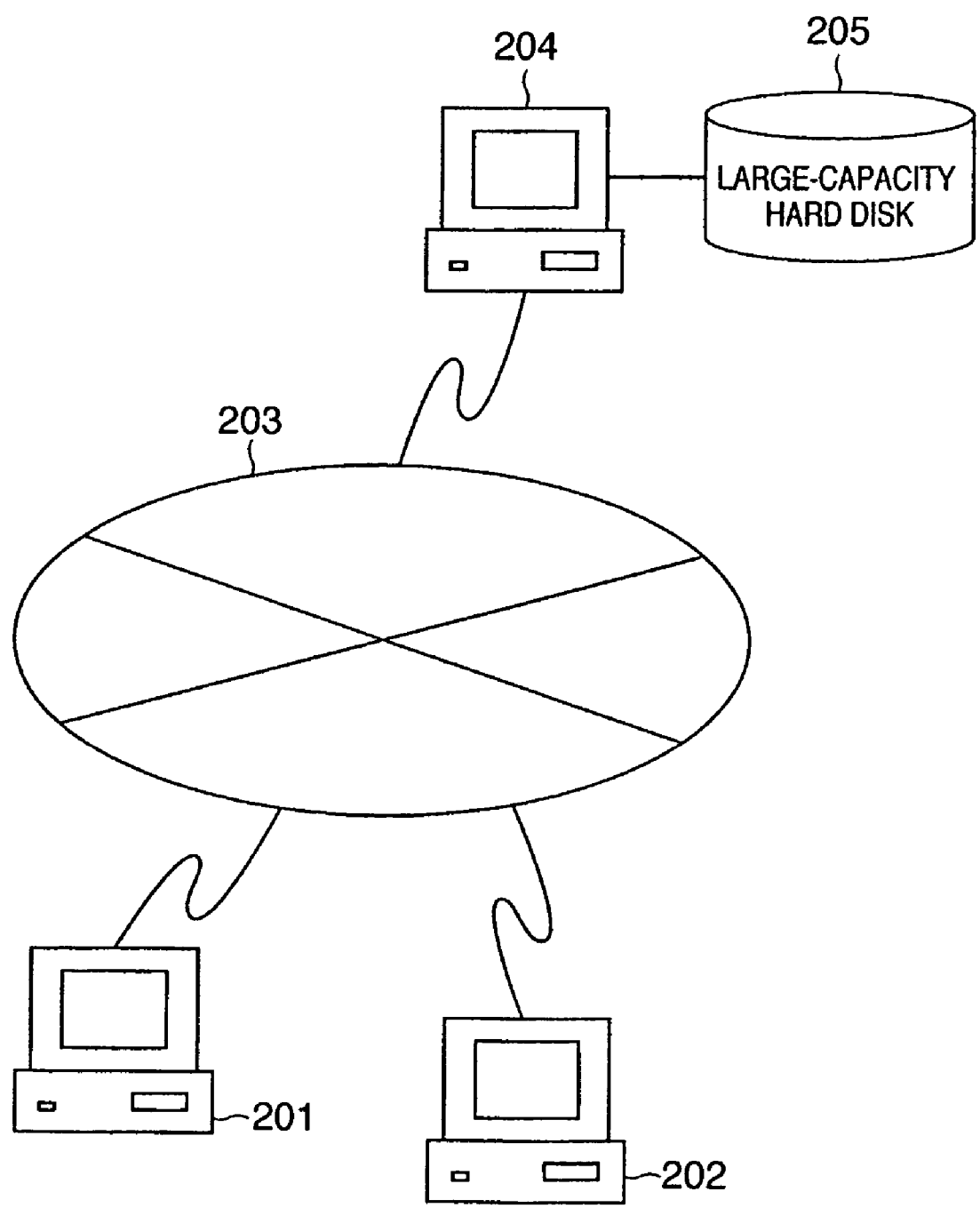
FIG. 2 is a schematic diagram showing the arrangement of the server/client system required to implement the first embodiment of the present invention.

FIG. 2 is a schematic diagram showing the arrangement of the server/client system required to implement the first embodiment of the present invention. Referring to FIG. 2, reference numerals 201 and 202 denote clients which are respectively operated by users 1 and 2, and each of which uses the computer shown in FIG. 1. The client 201 used by user 1 or the client 202 used by user 2 can communicate with a server 204 via a network 203. In FIG. 2, the computers of only two users are connected to the network 203. However, computers of three or more users may be similarly connected to the network 203. Also, the network 203 may be implemented by a wired or wireless network.

The server 204 can incorporate or externally connect a large-capacity storage device 205 which stores image files. The large-capacity storage device 205 corresponds to, e.g., a hard disk or the like. This hard disk stores many image data encoded by JPEG2000. User 1 of the client 201 or user 2 of the client 202 receives and saves fragmented data from JPEG2000 encoded image data managed by (or stored in) the server 204.

Figure 3:
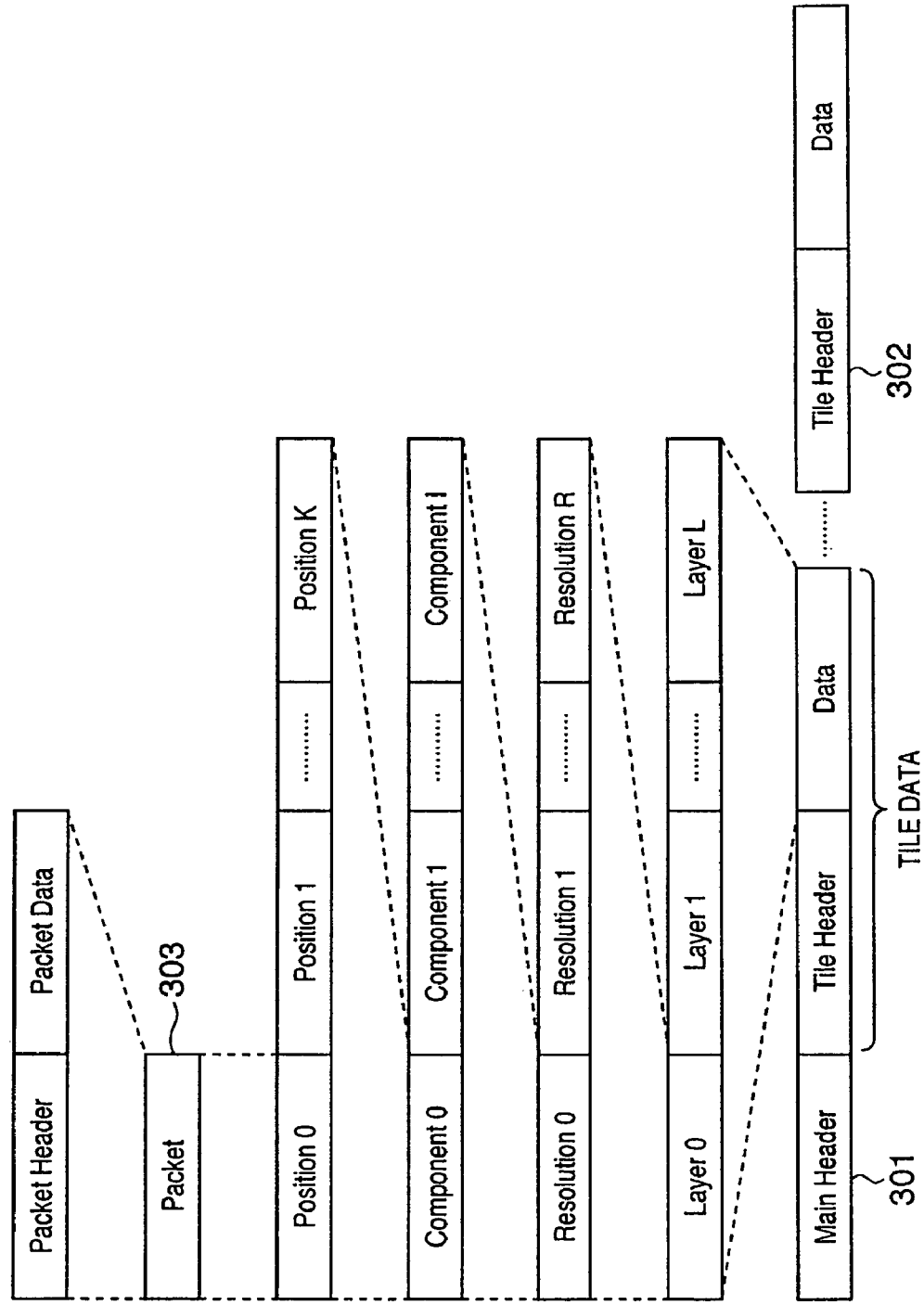
FIG. 3 is a view for explaining the configuration of general JPEG2000 encoded data.

FIG. 3 is a view for explaining the configuration of general JPEG2000 encoded data. The JPEG2000 encoded data holds data, which is called a "main header 301" and describes the encoding conditions of the entire image, at its head portion, and tile data follow the main header. Each tile data holds header data which is called a "tile header 302" and describes tile encoding conditions, and then holds encoding unit data called a "packet 303" which forms encoded data of the tile. Note that "position" described in FIG. 3 means "precinct" in the JPEG2000 encoded data.

Figure 4:
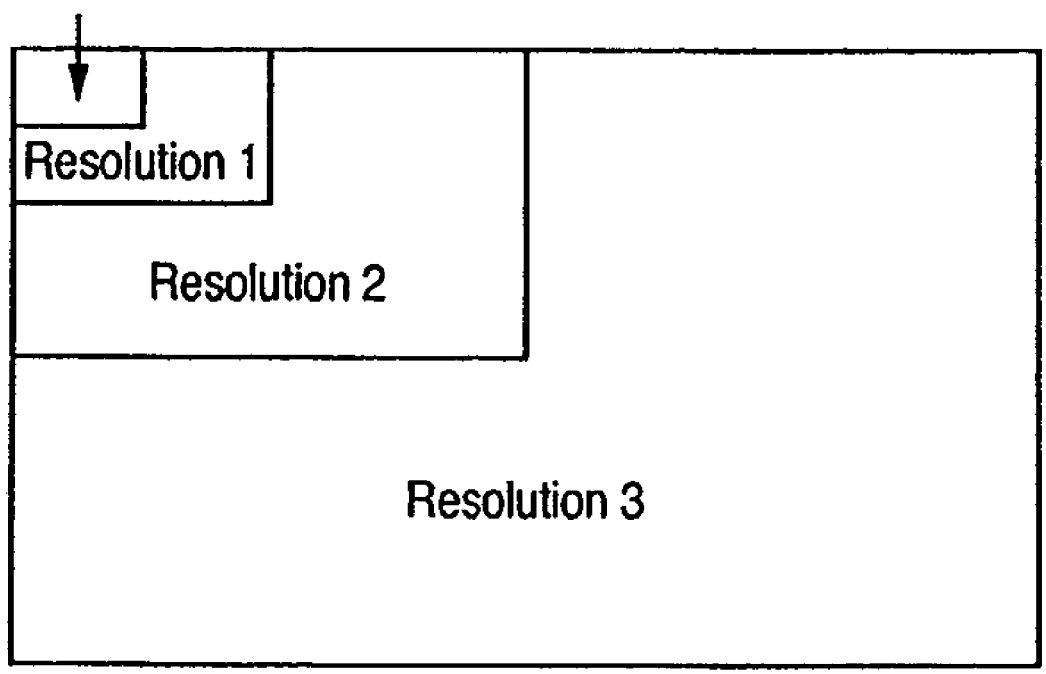
FIG. 4 shows the relationship between the resolutions (image sizes) of images and resolution numbers, i.e., the resolution scalability of JPEG2000.

FIG. 4 shows the relationship between the resolutions (image sizes) and resolution numbers of images, i.e., the resolution scalability of JPEG2000. As shown in FIG. 4, the resolution number of an image with a lowest resolution is set to be "0", and the width and height of the image are doubled as the resolution number increases by 1. Each layer stores data in ascending order of resolution number. Note that each layer number corresponds to the S/N ratio of an image to be reclaimed to an original image, and the S/N ratio impairs (lowers) with decreasing layer number. Note that the maximum values of the resolution number, layer number, and component number in one JPEG2000 file are set in advance by an encoder, and encoding is done according to these parameters. That information is stored in encoded data.

Using the aforementioned JPEG2000 encoded data, the user can receive only required partial data from the server without acquiring all image data stored in the server. As a unit of reception data of the user, a packet of JPEG2000 or a tile as an encoding unit larger than the packet may be used. In this embodiment, a packet unit is assumed as a data unit that the user receives from the server, as described above.

Figure 5:
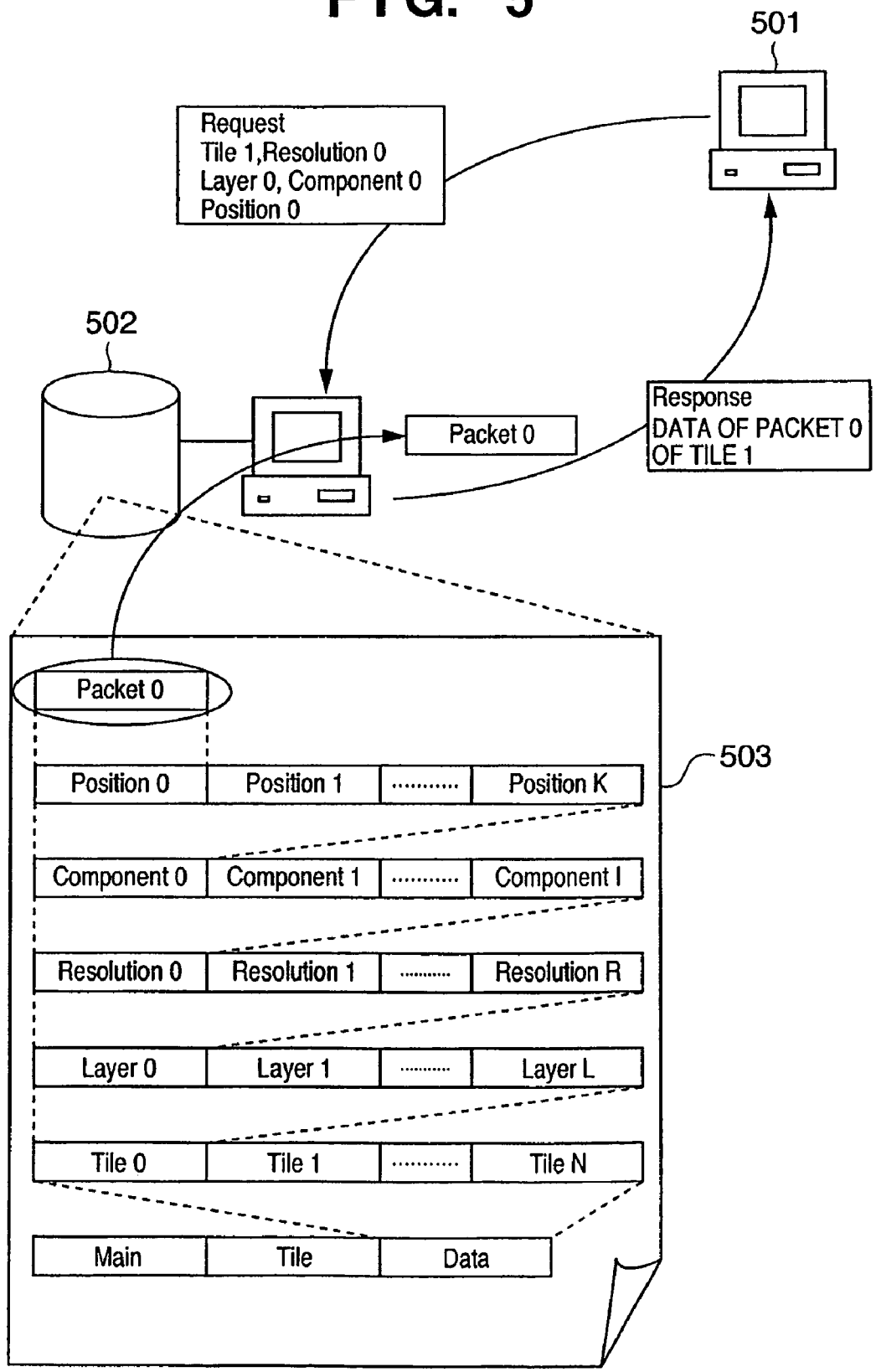
FIG. 5 is a conceptual view for explaining a communication protocol between the server and client using the relationship between a request and response for respective packets.

FIG. 5 is a conceptual view for explaining a communication protocol between the server and client using the relationship between a request and response for respective packets. That is, the user requests data from a client 501 to a server 502 by designating the tile number, resolution level, and layer, component, and position numbers of an image. In response to this request, the server 502 analyzes a codestream of an image 503, extracts packet data corresponding to the designated tile number, resolution level, and layer, component, and position numbers, and returns the extracted packet data to the client 501.

Figure 6:
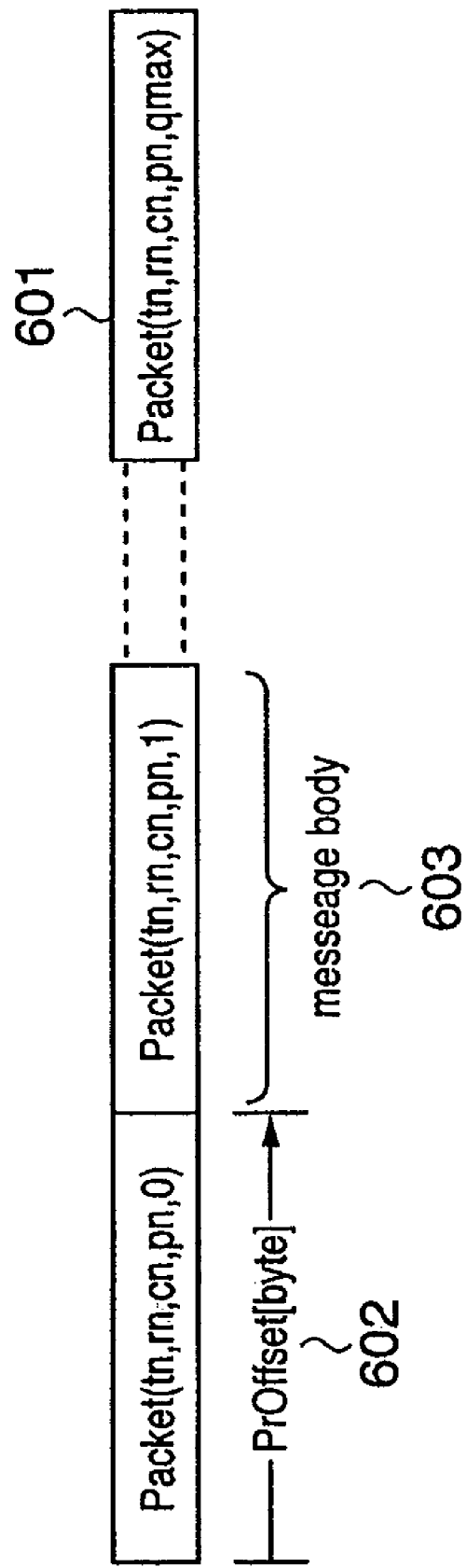
FIG. 6 is a conceptual view of a precinct data-bin.
Figure 7:
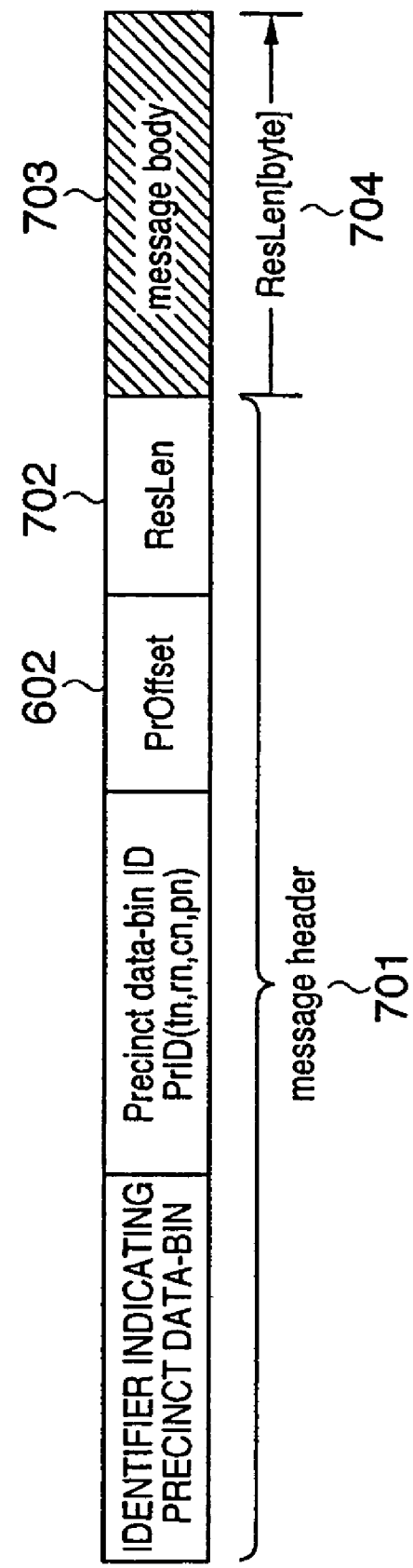
FIG. 7 is a conceptual view of JPIP response data.

The configuration of response data upon exchanging data using JPIP to have packet data as a transmission unit will be described below with reference to FIGS. 6 and 7. FIG. 6 is a conceptual view of a precinct data-bin. FIG. 7 is a conceptual view of JPIP response data.

In JPIP, as shown in FIG. 6, response data 601 is generated on the basis of a cluster of JPEG2000 packet data called a "precinct data-bin". The precinct data-bin is a cluster of data in which packets of all layers which form resolution level rn and component number cn of precinct pn in tile tn are arranged and combined in ascending order of layer number.

FIG. 7 shows an example of JPIP response data generated using a packet (tn, rn, cn, pn, 1) extracted from the precinct data-bin shown in FIG. 6. The JPIP response data includes a message header 701 and message body 703.

The message body 703 stores JPEG2000 encoded data extracted from the precinct data-bin 601. More specifically, when JPIP response data is generated by extracting a packet (tn, rn, cn, pn, 1) 603 shown in FIG. 6, the packet (tn, rn, cn, pn, 1) 603 is stored in the message body 703.

The message header 701 includes four parameters. As the first parameter, an identifier which indicates that data stored in the message body 703 is the precinct data-bin is stored. As the second parameter, a precinct data-bin ID (PrID) is stored. This ID can be uniquely determined from tile number tn, resolution level number rn, component number cn, and precinct number pn, and can be calculated by:

$$PrID(tn, rn, cn, pn) = tn + (cn + s \times (\text{number of components})) \times \text{number of tiles} \quad (1)$$

where $$s = pn + tn \times p(rn) + p(tr),$$

$p(rn)$: the number of precincts per tile at resolution level rn, and $p(tr)$: the sum total of the numbers of precincts of tile tr from resolution level 0 to (rn−1).

Furthermore, the third parameter is an offset value PrOffset 602 in the precinct data-bin of the response data. That is, the data stored in the message body 703 is the value which indicates the byte position of data in the precinct data-bin 601 of PrID(tn, rn, cn, pn), and is the same as that of PrOffset 602 in FIG. 6. The last parameter of the message header 701 is the byte length of the response data, i.e., the message body 703. Therefore, ResLen 702 stores the value of ResLen[byte] 704.

In this embodiment, assume that the server holds JPEG2000 encoded image data in each of which an image is divided into a large number of tiles in consideration of random accessibility. Note that each JPEG2000 encoded image data held by the server has encode conditions:

Maximum image size: 4064×2752 pixels
Tile size: 128×128 pixels
Number of tiles: 704 (=32×22)
Number of resolution levels: 5
Image sizes of respective resolution levels:
Resolution level 4: 4064×2752 pixels. (tile size: 128×128 pixels)
Resolution level 3: 2032×1376 pixels (tile size: 64×64 pixels)
Resolution level 2: 1016×688 pixels (tile size: 32×32 pixels)
Resolution level 1: 508×344 pixels (tile size: 16×16 pixels)
Resolution level 0: 254×172 pixels (tile size: 8×8 pixels)

Figure 8:
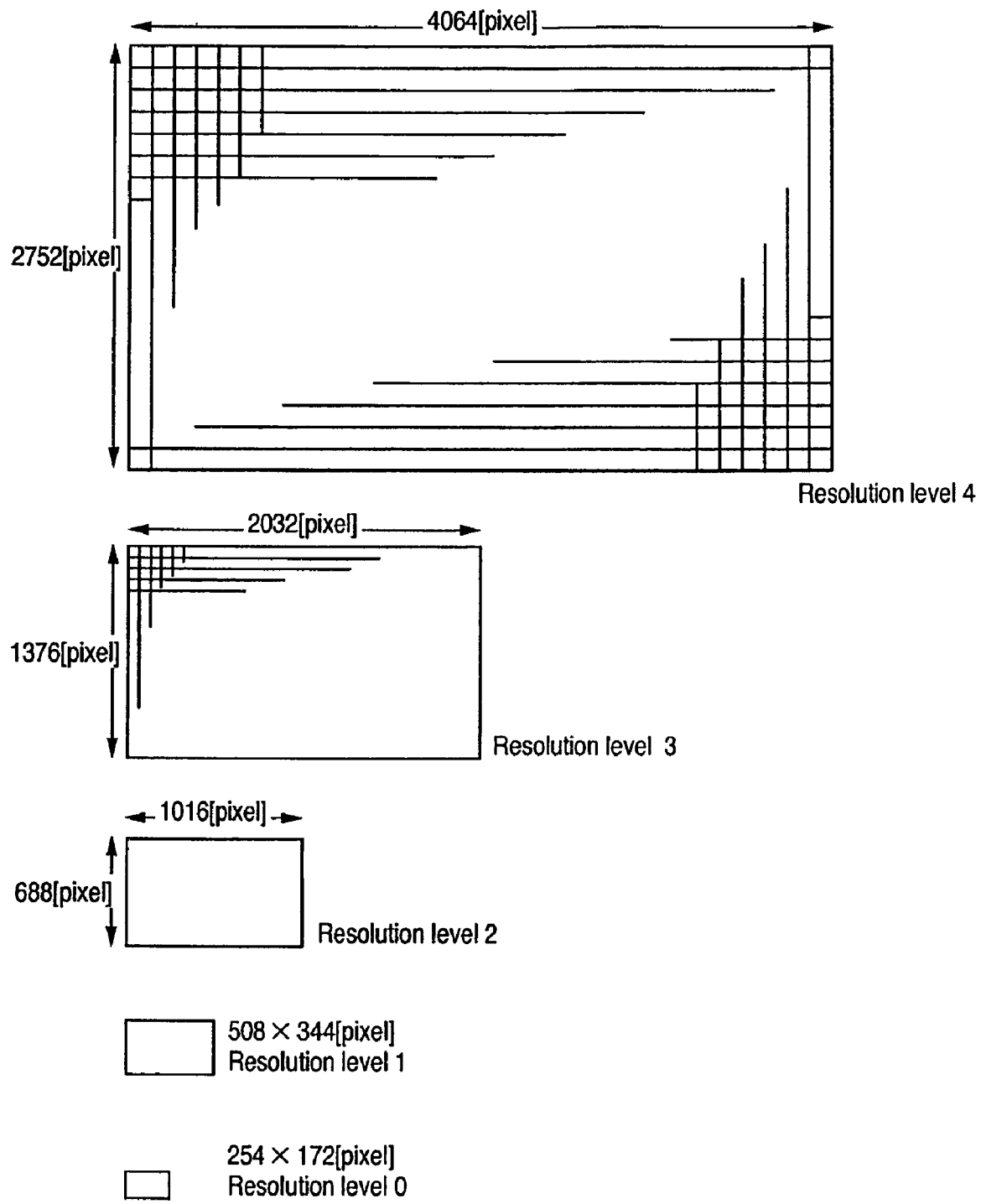
FIG. 8 is a conceptual view showing the configuration of a JPEG2000 encoded image held by the server.

FIG. 8 is a conceptual view showing the configuration of a JPEG2000 encoded image held by the server. As shown in FIG. 8, in all images of resolution levels 0 to 4, an image is divided into 704 tiles, which are assigned sequential tile numbers from the upper left tile. Note that FIG. 9 shows the relationship between the tiles and tile numbers of an image held by the server. In FIG. 9, tiles of an image 901 are those in an initial state, and are divided into a total of 704 tiles. Tiles in an image 902 are 176 tiles obtained by converting four tiles into one tile.

The server of this embodiment calculates an occupation ratio of a requested displayed area to the entire image by analyzing the request from the client. The server compares that value (occupation ratio) with a predetermined threshold. If the value is larger than the threshold (i.e., if the occupation ratio of the displayed area to the entire image is large), the server generates a codestream (e.g., image 902) by decreasing the number of tiles (increasing the tile size), and returns image data from the generated codestream to the client.

On the other hand, if the occupation ratio of the requested displayed area to the entire image is smaller than the threshold, i.e., if the occupation ratio of the requested displayed area to the entire image is small, the server returns image data from the original encoded data (e.g., image 901) to the client. In either case, the server assigns different identifiers to the codestream having the original number of tiles and that with the decreased number of tiles, and notifies the client of both the identifiers, a value indicating the codestream from which image data is returned, and the threshold used in the determination.

The client of this embodiment designates a file name of data of an image to be displayed by JPIP, and sends a request to JPEG2000. After that, upon reception of return data from the server, the client caches the returned data, and analyzes the return data to acquire the aforementioned two identifiers. In subsequent communications, the client issues a request to the server by selectively using the two identifiers in accordance with a display request from the self device.

The operations of the aforementioned server and client will be respectively described below with reference to the drawings.

<<Operation of Server>>

Figure 10:
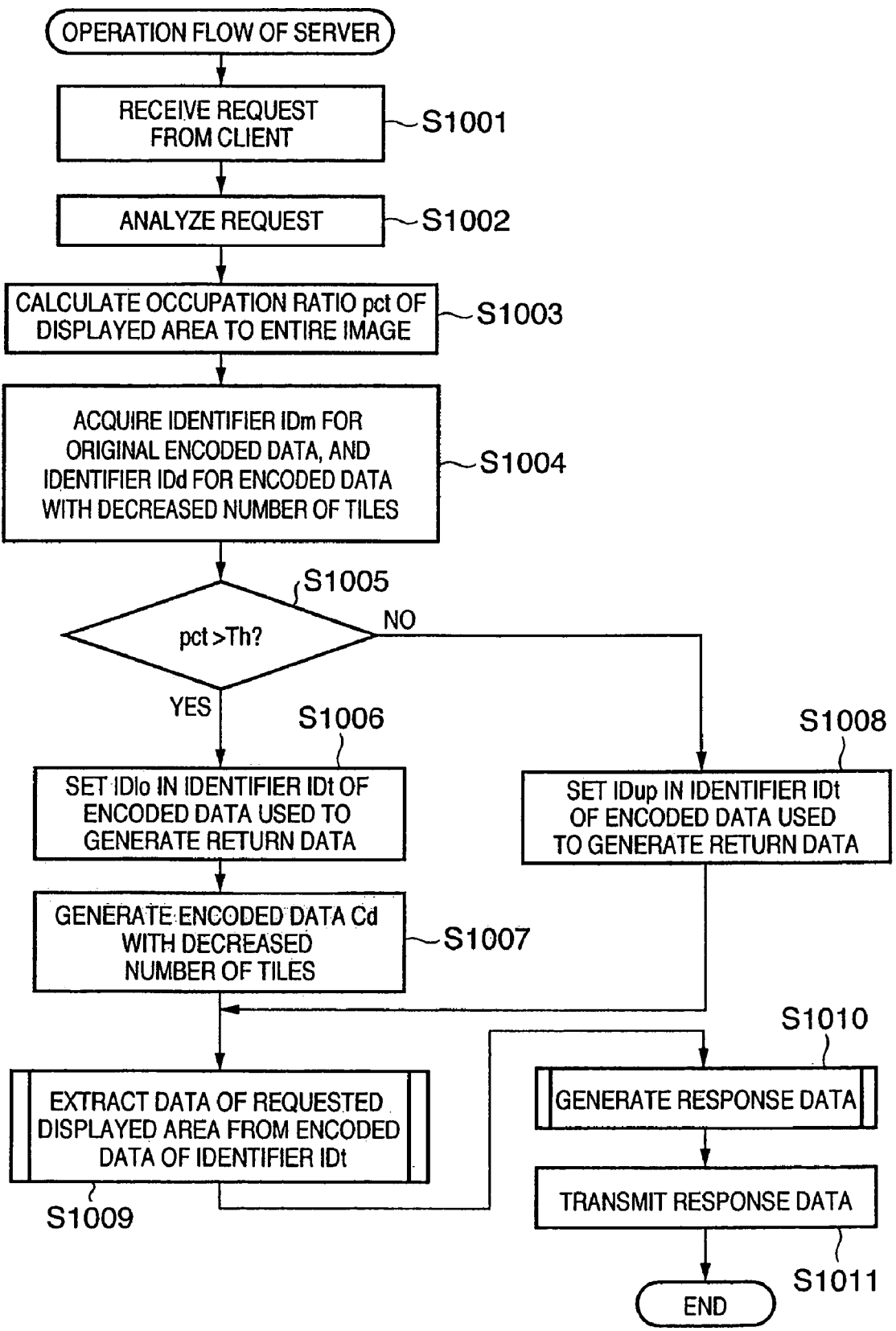
FIG. 10 is a flowchart for explaining the operation of a server 204 according to the first embodiment of the present invention.

Details of the operation of the server in this embodiment will be described first. FIG. 10 is a flowchart for explaining the operation of the server 204 in the first embodiment of the present invention.

The server 204 receives a request character string from the client (client 201 or the like) (step S1001). In this embodiment, assume that the following request for acquiring a thumbnail image is received: http://www.image.com/jpip.cgi?target=sample.jp2&fsiz=32 0,240&type=jpp-stream Note that the request character string designates the requested file name by "target", the size of entire image by "fsiz", and the return data format by "type".

Next, the server 204 analyzes the request character string received in step S1001 (step S1002). In this manner, the server can detect the name of the requested image file, the return data format, the conditions of the image to be displayed, and the like. Note that in this embodiment, the request can be analyzed that an image file "sample.jp2 is requested to have a size that allows the entire image to fall within 320×240 pixels, and its return data format is the precinct data-bin of JPIP.

The server 204 calculates an occupation ratio pct of the requested displayed area to the entire image (step S1003). In this embodiment, since an area of 320×240 pixels of the image of 320×240 pixels, i.e., the entire image is requested, pct=100.

Furthermore, the server 204 acquires an identifier IDm for original encoded data of the requested image, and an identifier IDd for encoded data with the decreased number of tiles (step S1004). As a method of assigning these identifiers, a character string which is prepared in advance based on the original file name, or a character string which is created based on the request or client may be used. However, such method is not the gist of the present invention, and a description thereof will be omitted. In this embodiment, sample_master_704 is used as the identifier IDm for the original encoded data, and sample_derive_176 is used as the identifier IDd for the encoded data with the decreased number of tiles.

The server 204 then compares the occupation ratio pct of the required displayed area to the entire image calculated in step S1003 with a threshold Th (step S1005). As a result, if the value of the ratio pct is larger than the threshold Th (Yes), the flow advances to step S1006; if the value of the ratio pct is smaller than the threshold Th (No), the flow advances to step S1008. Note that the server 204 sets the identifier IDm indicating the original encoded data in an identifier IDt of encoded data used to generate return data in step S1008, and the flow advances to step S1009.

In this embodiment, the threshold Th is set to be, e.g., 25. More specifically, if the requested displayed area is larger than ¼ the entire image, the flow advances to step S1006; if the requested displayed area is equal to or less than ¼, the flow advances to step S1008. Therefore, in case of the request of this embodiment which requests the entire image, since pct (=100)>Th (=25), the flow advances to step S1006.

In step S1006, the server 204 sets the identifier IDd indicating the encoded data with the decreased number of tiles in the identifier IDt of encoded data used to generate return data. The server 204 generates encoded data Cd with the decreased number of tiles from the original encoded data (step S1007). Assume that the encoded data to be generated has the same encode conditions, i.e., the number of resolution levels, bit depth, the number of layers, and the like except for the tile size as those of the original encoded data. Note that the identifier. IDd acquired in step S1004 is that corresponding to the encoded data to be generated in this step.

In this embodiment, by generating one tile from four neighboring tiles, a codestream Cd, the number of tiles of which is reduced to ¼ by generating one tile from four neighboring tiles, is generated. More specifically, tiles 0, 1, 32, and 33 of the image 901 in FIG. 9 are decoded, their decode results are combined into one tile so as to change the tile size of the original encoded data from 128×128 to 256×256, and the converted tile is encoded under substantially the same encode conditions except for the tile size. Likewise, one tile is generated from four tiles 2, 3, 34, and 35 of the image 901 to re-generate the encoded data of the entire image in turn. Finally, the encoded data Cd divided into 176 tiles is generated, as shown in the image 902 of FIG. 9.

In step S1009, the server 204 extracts data of the requested displayed area from the encoded data with the identifier IDt on the basis of the result obtained by analysis in step S1002. Note that this data extraction method will be described later using FIG. 11. The server 204 then generates JPIP response data (step S1010). Note that details of step S1010 will be described later using FIG. 12.

Furthermore, the server 204 transmits the response data generated in step S1010, i.e., the JPIP response header, JPIP message, and information header corresponding to the present invention, to the client (step S1011), thus ending the processing.

Figure 11:
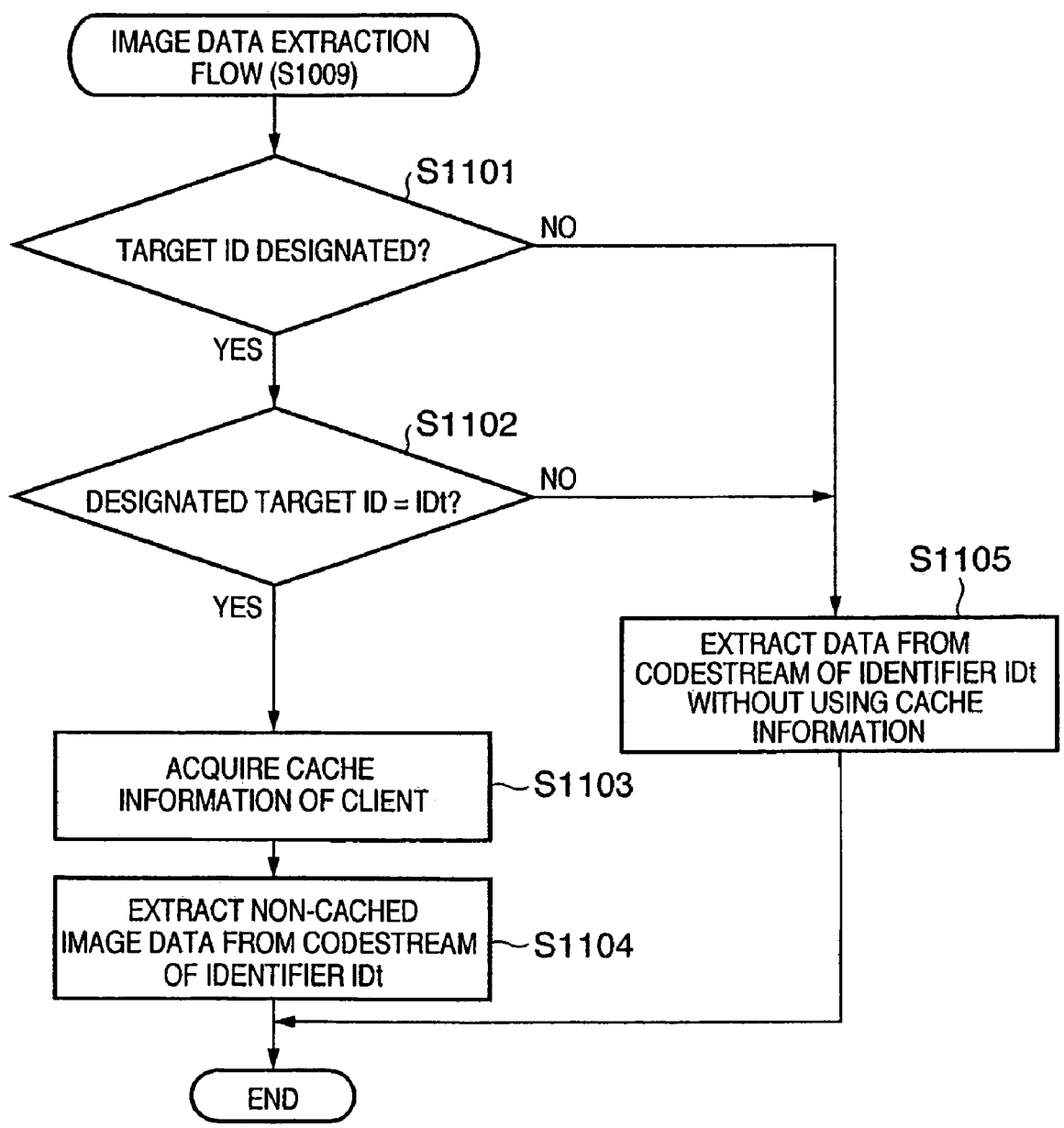
FIG. 11 is a flowchart for explaining the detailed processing sequence of return data extraction processing (step S1009) of the server 204 according to the first embodiment of the present invention.

FIG. 11 is a flowchart for explaining the detailed processing sequence of the return data extraction processing (step S1009) of the server 204 in the first embodiment. The server 204 checks if the request analyzed in step S1002 includes designation of a target ID (codestream identifier) (step S1101). As a result, if it is determined that designation is included (Yes), the flow advances to step S1102; if it is determined that no designation is included (No), the flow advances to step S1105.

More specifically, the server 204 determines that designation of the target ID (codestream identifier) is included if a tid field is included in the request, and its value is not zero. On the other hand, if the value of the tid field is zero, since the request is the notification to the client the target ID (i.e., codestream identifier) of the codestream from which the return data is extracted upon return, the server 204 determines that no target ID value is designated. Also, if the request does not include any tid field, the server 204 determines that no designation of the codestream identifier is included. In case of this embodiment, since the request does not include any designation of the target ID (codestream identifier), the flow advances to step S1105.

In step S1105, the server 204 extracts data from the codestream of the identifier IDt without using cache information of the client. That is, the server 204 also extracts the main header and tile headers in addition to the packet data and tile data. Note that the cache information of the client can be acquired by analyzing the request. More specifically, when the request includes any of need, model, tpneed, and tpmodel fields, the server 204 can detect the cache information of the client associated with the currently requested displayed area. Upon completion of the processing in step S1105, the flow advances to step If it is determined in step S1101 that the request includes designation of the target ID (codestream identifier) (Yes), the flow advances to step S1102. It is checked in step S1102 if the target ID designated in the request is the same as the identifier IDt of the codestream as a target from which return data is to be extracted. As a result, if the designated target ID matches IDt (Yes), the flow advances to step S1103; otherwise (No), the flow advances to step S1105, as described above.

In step S1103, the cache information of the client is acquired from the request analysis result in step S1002. The server 204 compares the cache information of the client acquired in step S1103 with the image display request obtained by analysis in step S1002, and extracts image data which is not cached on the client side from the codestream with the identifier IDt (step S1104).

Note that the processing for extracting data without using any cache information in step S1105 and that for extracting only non-cached data in step S1104 are the same as those of a normal JPIP server, and a description thereof will be omitted. Note that in case of this embodiment, data of resolution level 0 with the entire image size of 254×172 pixels is to be extracted.

Figure 12:
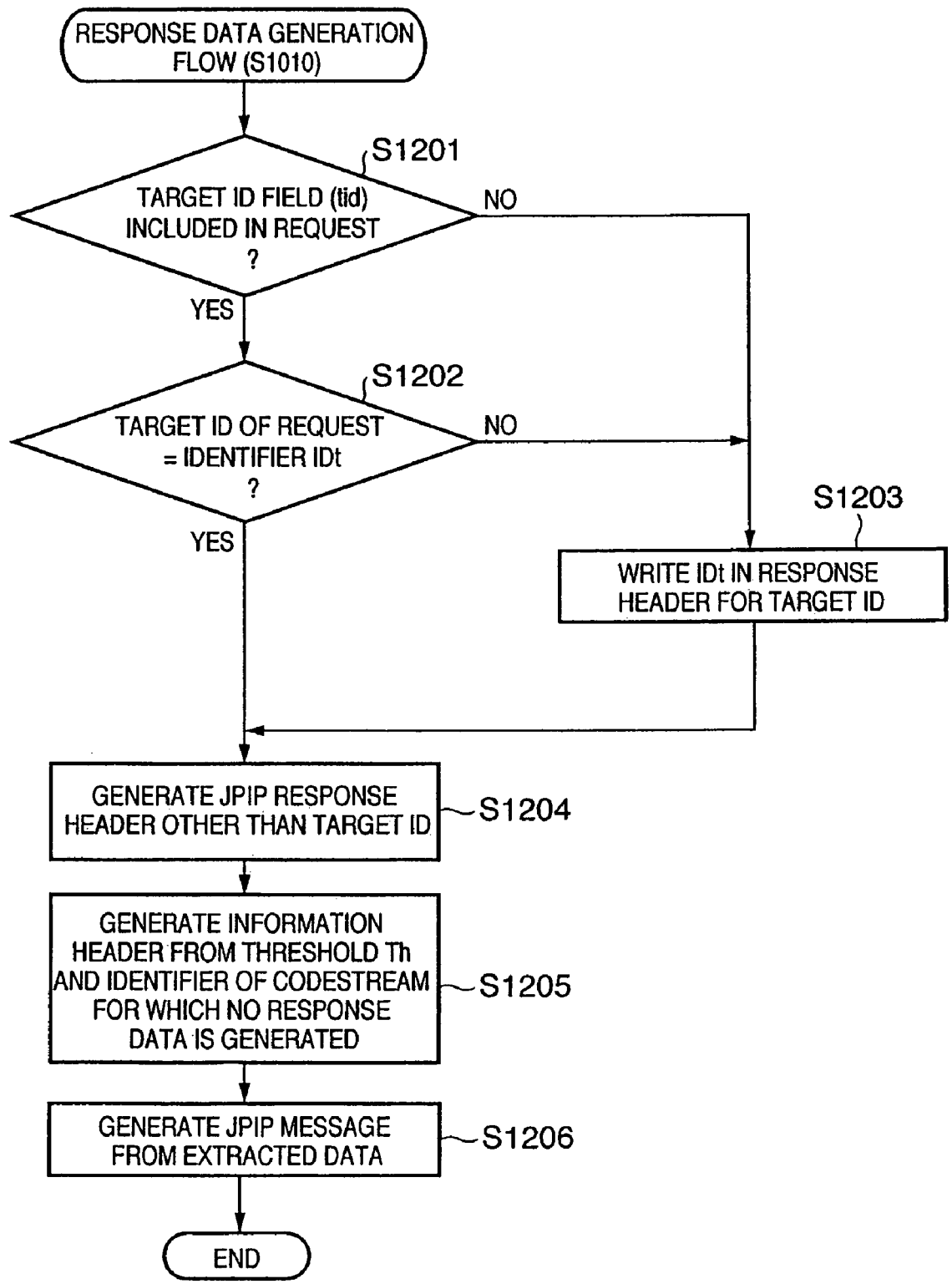
FIG. 12 is a flowchart for explaining the detailed processing sequence of response data generation processing (step S1010) of the server 204 according to the first embodiment of the present invention.

FIG. 12 is a flowchart showing the detailed processing sequence of the response data generation processing (step S1010) of the server 204 in the first embodiment. The server 204 checks if the request from the client includes a target ID field, i.e., a tid field (step S1201). As a result, if the request includes the tid field (Yes), the flow advances to step S1202; otherwise (No), the flow advances to step S1203.

Note that this checking step is done based on the analysis result in step S1002.

In step S1202, the server 204 compares the target ID of the request with the identifier IDt of the encoded data used to generate return data. As a result, if it is determined that the two IDs match, the flow advances to step S1204; otherwise (No), the flow advances to step S1203.

In step S1203, the server 204 writes the identifier IDt in a response header for the target ID, i.e., in a JPIP-tid header, and the flow advances to step S1204. That is, only when the target ID included in the request matches the identifier IDt, no JPIP-tid header need be generated.

In this embodiment, since the request from the client does not include any tid field, the flow advances from the branch in step S1201 to step S1203 and the server 204 generates a JPIP response header expressed by:

JPIP-tid: sample_derive_176

In step S1204, the server 204 generates a JPIP response header other than the JPIP response header (JPIP-tid) of the target ID. That is, the server 204 generates a JPIP response header for the request when the parameters of the request obtained by analysis in step S1002 are different from the data values extracted in step S1009. Note that this operation is the same as that of the normal JPIP server, and a detailed description thereof will be omitted.

In this embodiment, the server 204 generates a JPIP response header described by:

JPIP-fsiz: 254, 172
JPIP-rsiz: 254, 172

The first line of the JPIP response header indicates the size of the entire image of return image data, and is described since it is different from 320×240 designated by the request. The second line of the JPIP response header indicates the size of the return data area, and is described since it is different from a data area 320×240 designated by the request.

In step S1205, the server 204 generates, based on the threshold Th and the codestream identifier which is not used in generation of the response data, an information header described by:

another-tid: sample_master_704
threshold: 25

The first line of the information header describes the codestream identifier which is not used in generation of the current response data. That is, in this embodiment, the identifier IDm of the original encoded data corresponds to this identifier. Contrary to this embodiment, if return data is extracted from the original encoded data, the identifier IDd is described. The second line of the information header describes the threshold used to switch between sample_derive_176 and sample_master_704.

In step S1206, the server 204 generates data of a JPIP message format shown in FIG. 7 from the image data extracted in step S1009, thus ending this processing flow. Since this operation for generating the JPIP message is also the same as that of the normal JPIP server, a detailed description thereof will be omitted.

As described above, in step S1206 of this embodiment, the server 204 changes the encoded data extracted in step S1007 to the jpp-stream format to generate the data of the JPIP message format shown in FIG. 7. More specifically, the server 204 generates the data of the JPIP message format shown in FIG. 7 from the image data extracted in step S1009, also generates the JPIP response header according to the definition of JPIP, and further generates the information header.

In this case, the JPIP response header describes the identifier corresponding to the codestream from which the image data is extracted. On the other hand, the information header describes the identifier of the codestream from which no image data is extracted currently and the threshold. Therefore, in case of this embodiment, the server 204 generates, according to the processing flow described using FIG. 12, response data described by:

JPIP-tid: sample_derive_176
JPIP-fsiz: 254, 172
JPIP-rsiz: 254, 172
another-tid: sample_master_704
threshold: 25
[binary data based on jpp-stream]

As described above, the server 204 according to this embodiment verifies the tid field of the request from the client. When no tid field is included, the server 204 determines that the client does not recognize a codestream from which data is to be returned, and returns all data required to display.

When the tid field is included in the request, but the client designates the identifier different from that of the codestream which is set as a return codestream by the server, the server 204 determines that cache data on the client side of which the server is notified by the client is extracted from a codestream different from that of the return data, and returns all data required to display without using that cache data. Furthermore, only when tid designated in the request matches the codestream identifier set as a server return codestream, the server 204 determines that notification of cache data from the client is valid, and extracts partial image data which can be determined not to be cached by the client.

Even when the client which is not compatible to the server/client system according to this embodiment receives the aforementioned return data, it can ignore the aforementioned information header as an unrecognizable extended HTTP entity header. When the codestream identifier designated by the JPIP-tid response header is different from that returned before that response, the client discards data cached so far, and displays an image using newly received data. In this case, since the return data from the server includes all data required to display as well as the main header, no image display failure occurs under the display conditions requested on the client side.

<<Operation of Client>>

Figure 13:
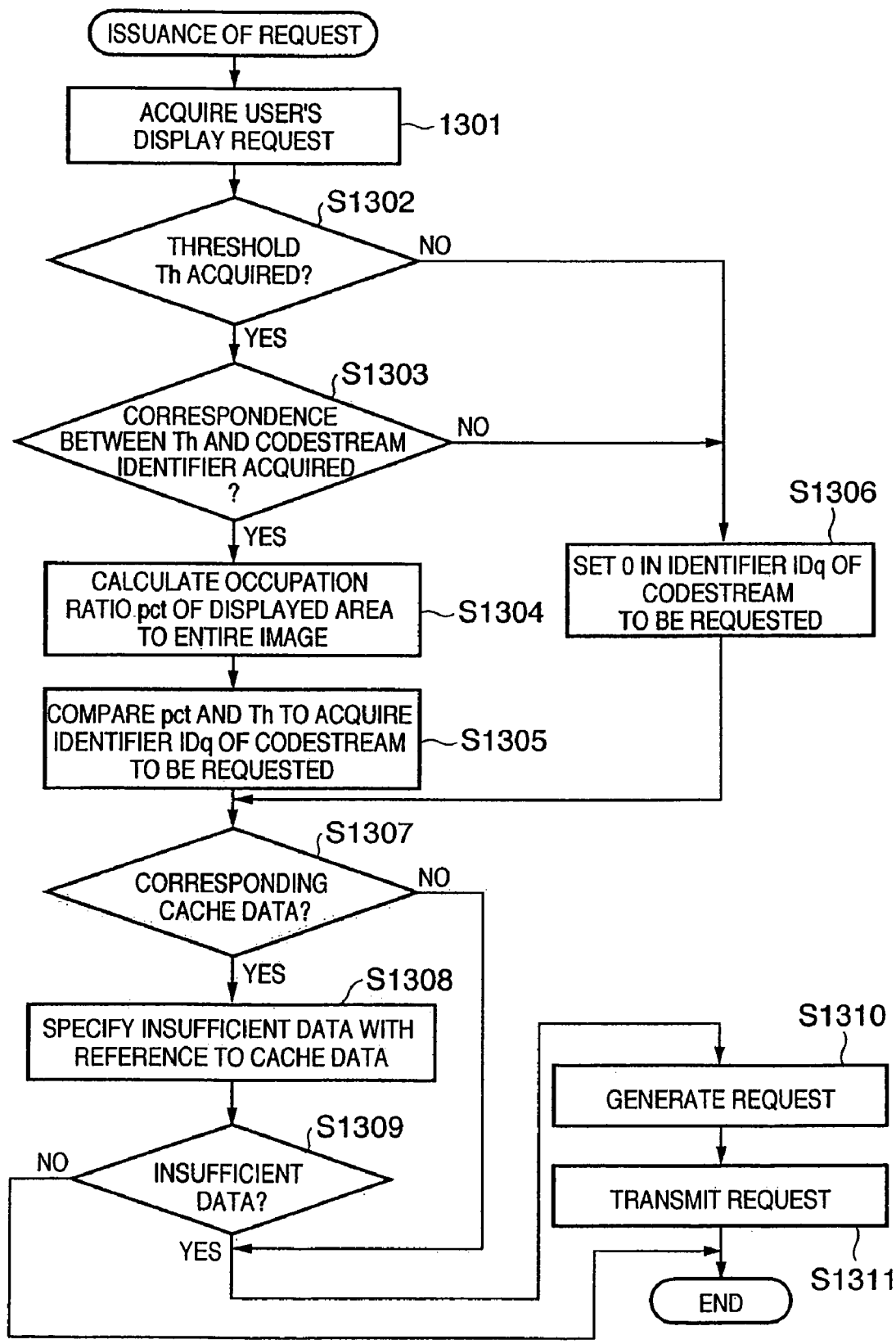
FIG. 13 is a flowchart for explaining the request issuance sequence of the client according to the first embodiment of the present invention.

Details of the operation of the client (client 201 or 202 in FIG. 2) in this embodiment will be described below. FIG. 13 is a flowchart for explaining the request issuance sequence of the client according to this embodiment. Assume that there is no preliminary agreement between the server and client about a threshold used to switch codestreams, and the client makes the first access to sample.jp2 and issues a request to display the entire image with a size about 320×240 pixels.

The client acquires a display request input by the user (step S1301). That is, the client acquires the name of an image to be displayed, the size of the entire image, a partial area to be displayed, and the like. In this embodiment, the image name is sample.jp2, the size of the entire image to be displayed is about 320×240 pixels, and the area to be displayed is the entire image.

The client acquires a threshold Th corresponding to the image file acquired in step S1301 (step S1302). If the client can acquire the threshold Th (Yes), the flow advances to step S1303; otherwise (No), the flow advances to step S1306. In this embodiment, since the client makes the first access to sample.jp2, and no preliminary agreement about the threshold Th is made between the server and client, the flow advances to step S1306.

In step S1306, the client sets zero in an identifier IDq of a requested codestream. Next, the client checks if corresponding cache data exists (step S1307). As a result, if it is determined that the corresponding cache data exists (Yes), the flow advances to step S1308; otherwise (No), the flow jumps to step S1310. In this embodiment, since the client makes the first access to sample.jp2, there is no cache data, and the flow jumps to step S1310.

In step S1310, the client generates a request on the basis of the user's display request acquired in step S1301 and the cache data reference result. Note that generation of this request character string is the operation of a normal JPIP client, and a description of the detailed operation will be omitted.

The request character string generated in this embodiment is:

http://www.image.com/jpip.cgi?target=sample.jp2&fsiz=320,240&type=jpp-stream&tid=0

After that, the client outputs the request generated in step S1310 to the server 204 (step S1311), thus ending this request issuance flow. Next, assume that the client has already displayed the entire image of resolution level 0, and has saved that data.

Figure 14:
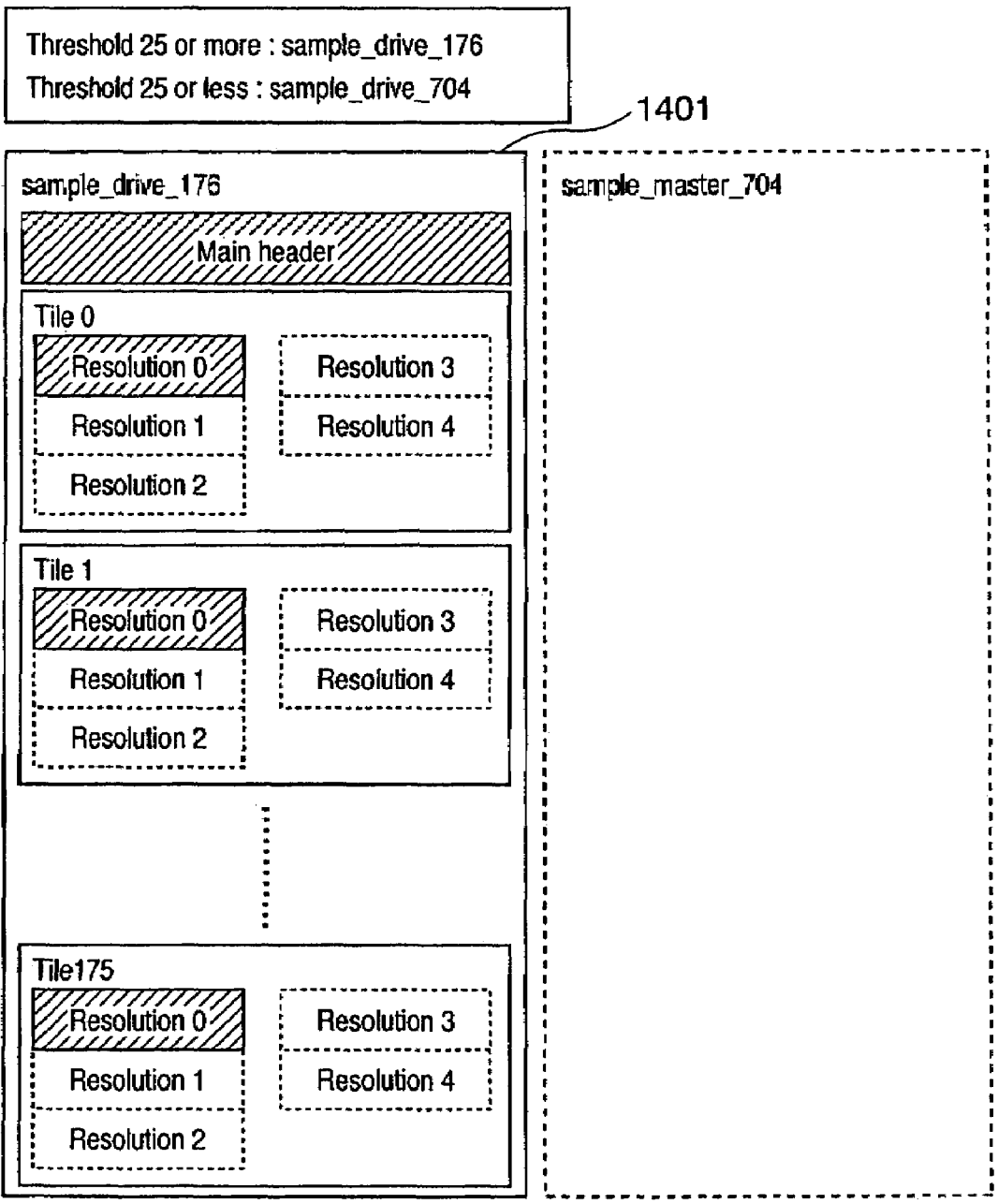
FIG. 14 is a conceptual view showing an example of cache data of the client after thumbnail acquisition according to the first embodiment of the present invention.

FIG. 14 is a conceptual view showing an example of cache data of the client after thumbnail acquisition according to the first embodiment of the present invention. A case will be explained below wherein the client saves the cache data shown in FIG. 14, and then displays an upper left area of the image on an area of 512×512 pixels at resolution level 2.

As described above, the client acquires the threshold Th (=25) (step S1302), and the flow advances to step S1303. Note that the client can easily detect the threshold Th by analyzing the information header acquired upon making a communication with the server 204. In step S1303, the client acquires correspondence between the threshold Th and codestream identifier. As a result, if the correspondence can be acquired (Yes), the flow advances to step S1304; otherwise (No), the flow advances to step S1306. Note that the method of acquiring the correspondence will be described later using the flowchart of the return data reception sequence in the client shown in FIG. 15.

In this embodiment, the client can acquire the correspondence indicating that the identifier of a codestream to be requested is sample_derive_176 if the occupation ratio pct of the displayed area to the entire image is larger than the threshold Th (=25), or it is sample_master_704 if the occupation ratio pct is smaller than the threshold Th.

In step S1304, the client calculates the occupation ratio pct of the area to be displayed to the entire image on the basis of the user's display request acquired in step S1301. In this embodiment, since the size of resolution level 2 is 1016×688 pixels, and the area to be displayed is an upper left area (512×512 pixels) of that image, we have:

$$pct=100\times(512\times512)/(1016\times688)\approx37.5$$

Next, the client compares the ratio pct of the displayed area calculated in step S1304 with the threshold Th acquired in step S1302, and acquires the identifier IDq of a codestream to be requested based on the comparison result and the correspondence between the threshold Th and codestream identifier acquired in step S1303 (step S1305). In this embodiment, since pct (≈37.5)>Th (=25), the identifier IDq of the codestream to be requested is sample_derive_176.

The client then checks if corresponding cache data exists (step S1307). As a result, if existence of the cache data is specified (Yes), the flow advances to step S1308, otherwise (No), the flow jumps to step S1310.

In this embodiment, since the identifier IDq specified in step S1305 is sample_derive_176, the client specifies in step S1307 if cache data corresponding to this identifier exists. Since the client has already received data from a codestream having sample_derive_176 as the identifier upon displaying the entire image at resolution level 0, it stores cache data 1401 shown in FIG. 14. For this reason, as a result of the checking processing in step S1307, the flow advances to step S1308.

In step S1308, the client compares the display request acquired in step S1301 with reference to the corresponding cache data to specify insufficient data. In this embodiment, a cache stores the cache data 1401 shown in FIG. 14. Furthermore, since the user requests to display the upper left area of the image on the area of 512×512 pixels, i.e., to display images of tiles 0, 1, 16, and 17 at resolution level 2, it is detected that the specified insufficient data corresponds to resolution levels 1 and 2 of four tiles 0, 1, 16, and 17.

Next, the client checks if the insufficient data is specified by the processing in step S1308 (step S1309). As a result if it is determined that the insufficient data is specified (Yes), the flow advances to step S1310; otherwise (No), since the user's display request can be met by only the cache data, this processing ends. Since the processes in step S1310 and step S1311 after that step are as described above, a description thereof will be omitted.

Figure 15:
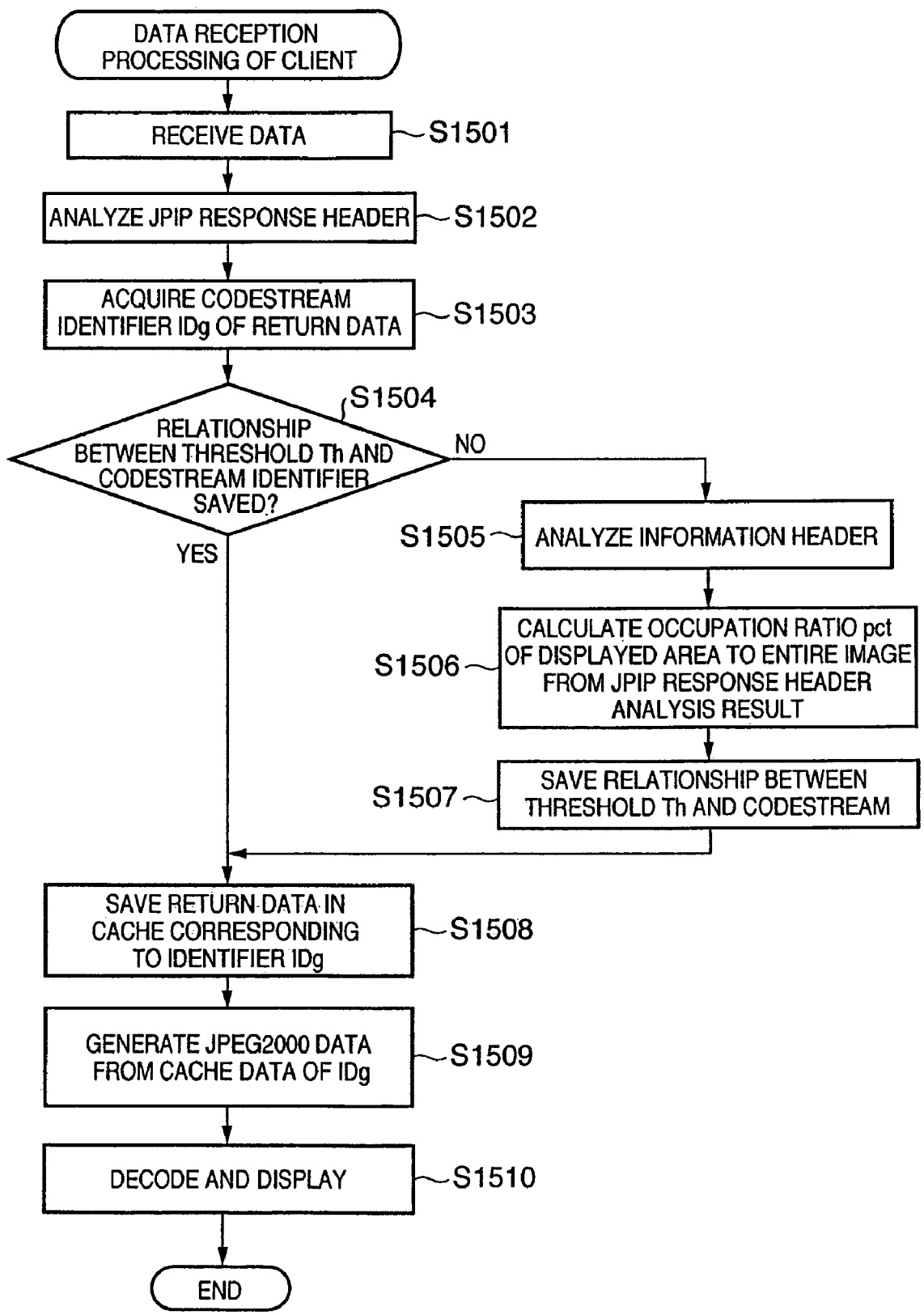
FIG. 15 is a flowchart for explaining the data reception processing sequence of the client according to the first embodiment of the present invention.

Therefore, after the processing flow shown in FIG. 13, the client according to this embodiment transmits, to the server 204, a request described by:

http://www.image.com/
jpip.cgi?target=sample.jp2&tid=sam ple_derive_
176&fsiz=1016,688&rsiz=512,512&need=r1-2&typ e=jpp-
stream The operation of the client which received the response data from the server 204 will be described below. FIG. 15 is a flowchart for explaining the data reception processing sequence of the client according to the first embodiment of the present invention.

The client makes the first access to sample.jp2, and issues a request to display the entire image with a size of about 320×240 pixels. A case will be described below wherein return data described by:

JPIP-tid: sample_derive_176
    JPIP-fsiz: 254, 172
    JPIP-rsiz: 254, 172
    another-tid: sample_master_704
    threshold: 25
    [binary data based on jpp-stream] is transmitted from the server 204.

The client receives the aforementioned return data transmitted from the server 204 (step S1501). Next, the client analyzes the JPIP response header included in the received data to recognize image data to be received (step S1502). Since analysis and interpretation of the JPIP response header are the same operations as those of the normal JPIP client, a detailed description thereof will be omitted.

In this embodiment, it is detected based on analysis in step S1502 that the return image data is full data of the image with a size of 254×172 pixels. Also, it is detected that the ID (identifier) of a codestream from which that return data is extracted is sample_derive_176.

The client then acquires a codestream identifier IDg of the returned data from the analysis result in step S1502 (step S1503). In this embodiment, the codestream identifier IDg is sample_derive_176.

Furthermore, the client checks if it has already saved the correspondence between the threshold Th and codestream identifier (step S1504). As a result, if it is determined that the client has already saved the correspondence (Yes), the flow advances to step S1508; otherwise (No), the flow advances to step S1505. In this embodiment, since the client makes the first access to sample.jp2 and it is determined that the client does not save any correspondence between the threshold Th and codestream identifier (No in step S1504), the flow advances to step S1505.

In step S1505, the client analyzes the information header included in the return data. In case of this embodiment, it is detected from "another-tid: sample_master_704" that the identifier of a codestream of sample.jp2 which is not used in current return data generation is sample_master_704, and it is also detected from "threshold: 25" that two codestreams "sample_master_704" and "sample_derive_176" are switched to have the occupation ratio of the displayed area to the entire image=25% as a boundary.

The client then calculates the occupation ratio pct of the displayed area to the entire Image from the analysis result of the JPIP response header obtained in step S1501 (step S1506). In this embodiment, since the entire image is returned as the displayed area based on the JPIP response header "JPIP-fsiz: 254, 172" and "JPIP-rsiz: 254, 172", pct=100.

Furthermore, the client saves the relationship between the threshold Th and codestream based on the analysis result in step S1505 and pct calculated in step S1506 (step S1507). In this embodiment, the return data is generated from the codestream with the identifier "sample_derive_176" in a state of pct (=100)>Th (=25). Therefore, a relationship indicating that sample_derive_176 is the identifier of the target codestream when pct>Th, and sample_master_704 is the identifier of the target codestream when pct≦Th is derived, and this result is saved.

The client also saves the return data in a cache corresponding to the identifier IDg (step S1508). Note that the return data cache method may use a method described in, e.g., Japanese Patent Laid-Open No. 2003-179760 or may use other methods. Since this cache method is not the gist of the present invention, a detailed description thereof will be omitted. In this embodiment, the return data is saved in a cache corresponding to sample_derive_176. However, since the client makes the first access to sample.jp2, it creates a new cache corresponding to sample_derive_176, and saves the return data in it.

The client generates JPEG2000 data from the cache data of the codestream of the identifier IDg saved in step S1508 (step S1509). The client decodes the JPEG2000 data generated in step S1509, and then displays the decoded data (step S1510), thus ending this reception flow.

When the client which is compatible to this embodiment sends a request to a server which is incompatible to this embodiment, since the request sent from the client follows JPIP, it is processed as a normal request.

As described above, using the server/client system according to this embodiment, when the occupation ratio of the area to be displayed to the entire image represented by thumbnail display is large, the client can receive and display partial data of encoded data with a small number of tiles. On the other hand, when the occupation ratio of the area to be displayed to the entire image represented by enlarged display is small, the client can receive and display partial data of encoded data with a large number of tiles.

Therefore, when a relatively small image is to be displayed, since JPEG2000 encoded data generated from cache data has a small number of tiles, the number of times of file seek operations is reduced, and the time required until display can be effectively shortened. On the other hand, when a large image is to be partially displayed, the transfer data volume is reduced since image data is formed of tiles with a small size, and the communication time can be effectively shortened.

Second Embodiment

In the first embodiment described above, images held by the server 204 assume JPEG2000 encoded image data in each of which an image is divided into a large number of tiles in consideration of random accessibility.

Note that some systems may use many images which are kept in relatively small sizes in list display in most cases, and only several ones of these images may undergo operations such as enlargement or the like. In such case, the server may hold JPEG2000 encoded images with a small number of divided tiles, and the number of tiles may be increased as needed. Hence, in this embodiment, each JPEG2000 encoded image data held by the server has encode conditions:

Maximum image size: 4064×2752 pixels
Tile size: 256×256 pixels
Number of tiles: 176 (=16×11)
Number of resolution levels: 5
Image sizes of respective resolution levels:
Resolution level 4: 4064×2752 pixels (tile size: 256×256 pixels)
Resolution level 3: 2032×1376 pixels (tile size: 128×128 pixels)
Resolution level 2: 1016×688 pixels (tile size: 64×64 pixels)
Resolution level 1: 508×344 pixels (tile size: 32×32 pixels)
Resolution level 0: 254×172 pixels (tile size: 16×16 pixels)

Assume that the arrangements of the server and client and that of the server/client system in the second embodiment are the same as those in the first embodiment shown in FIGS. 1 and 2.

Figure 16:
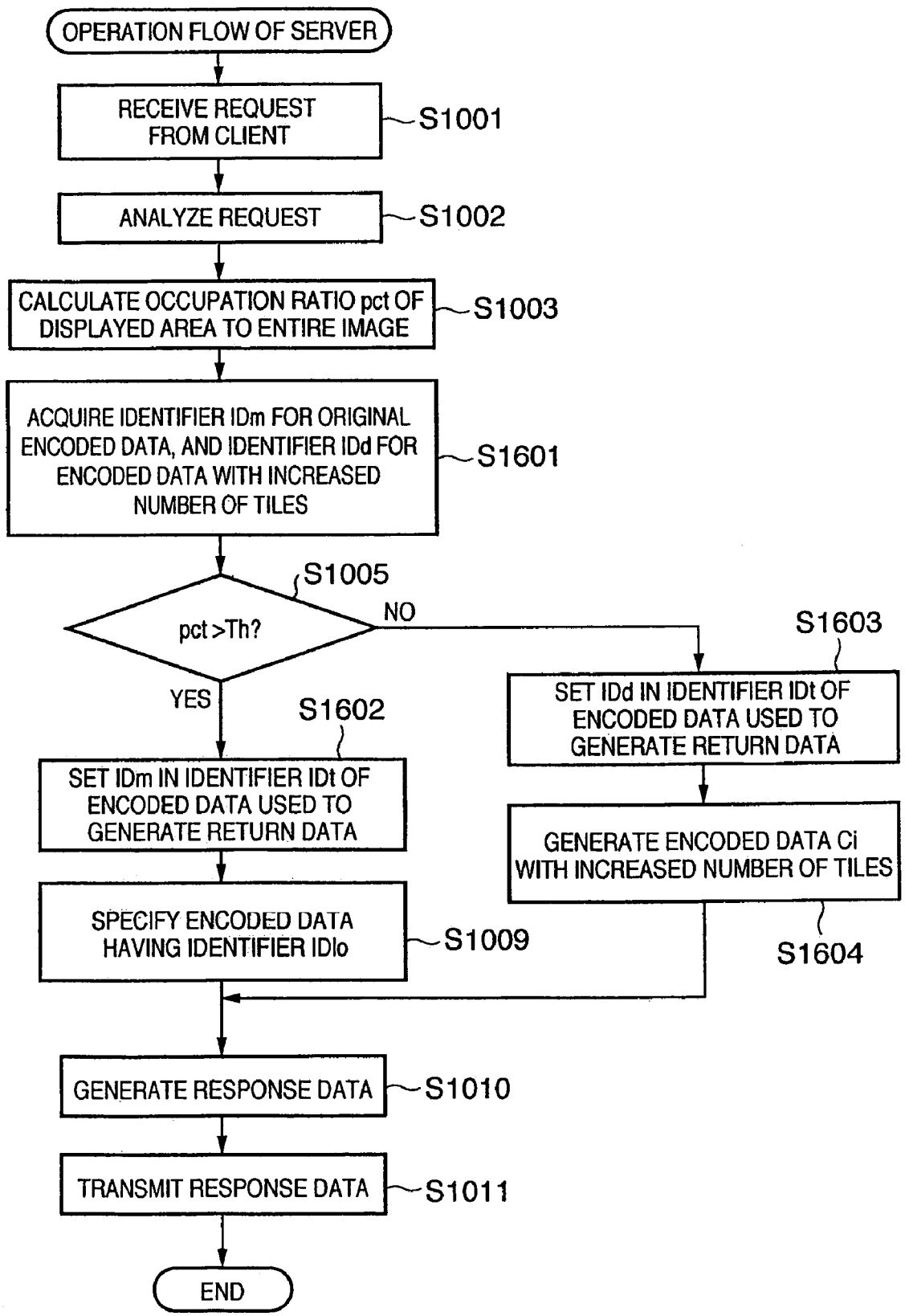
FIG. 16 is a flowchart for explaining the operation of the server 204 according to the second embodiment of the present invention.

When the aforementioned image data is used, processing different from the first embodiment described above is that on the server 204 side, i.e., the processing contents and sequence in steps S1004 to S1008 of the operation on the server side shown in the flowchart of FIG. 10. FIG. 16 is a flowchart for explaining the operation of the server 204 according to the second embodiment of the present invention. Note that the same step numbers as in FIG. 10 in the flowchart shown in FIG. 16 denote the same operations as in the flowchart shown in FIG. 10 described in the first embodiment, and a detailed description thereof will be omitted.

The server 204 according to the second embodiment receives a request from the client (step S1001), analyzes the request (step S1002), and calculates an occupation ratio pct of the displayed area to the entire image (step. S1003) as in the first embodiment.

Next, the server 204 acquires an identifier IDm for original encoded data, and an identifier IDd for encoded data with the increased number of tiles (step S1601). The server 204 then checks if the occupation ratio pct of the displayed area to the entire image is larger than a predetermined threshold Th (step S1005). As a result, if it is determined that the ratio pct is larger than the threshold Th (Yes), the server 204 sets the identifier IDm corresponding to the original encoded data in an identifier IDt of encoded data used to generate return data (step S1602). That is, in the second embodiment, the value of the identifier assigned to a codestream of an image divided into 176 tiles is used as IDt.

On the other hand, if it is determined in step S1005 that the occupation ratio pct of the displayed area to the entire image is equal to or smaller than the predetermined threshold Th (No.), the server 204 sets the identifier IDd assigned to the codestream with the increased number of tiles in the identifier IDt of encoded data used to generate return data (step S1603). Then, the server 204 generates encoded data Ci with the increased number of tiles from the original encoded data (step S1604). Note that the identifier for the encoded data generated in step S1604 is IDd.

In this embodiment, a codestream Ci whose number of tiles is increased to four times by generating four tiles from one tile is generated. That is, tile 0 of the image 902 in FIG. 9 is decoded, the decoded tile is divided into four tiles so as to halve the tile size of the original encoded data from 256×256 to 128×128, and the converted tiles are encoded under substantially the same encode conditions except for the tile size. Likewise, four tiles are generated from tile 1 of the image 902 to re-generate the encoded data of the entire image in turn. Finally, the encoded data Ci divided into 704 tiles is generated like the image 901 of FIG. 9.

After the processes in steps S1602 and S1604, the server 204 extracts data of the requested displayed area from the encoded data with the identifier IDt (step S1009), generates response data (step S1010), and transmits the response data (step S1011) as in the first embodiment.

As described above, when the number of tiles is small, the number of tile headers and that of packets are reduced, and the data size of the JPEG2000 encoded data becomes small. For this reason, the capacity of images held on the server side can be effectively reduced.

Also, in a system like a digital brochure in which the user browses an image list with a given size and displays only a favorite article in an enlarged scale, the number of times of conversion processing on the server side can be reduced using the method according to this embodiment, thus effectively reducing the load.

Third Embodiment

In the first and second embodiments described above, data held by the server 204 have common encode conditions. In some systems, common encode conditions may be used. However, in a system to which various images are uploaded, it is difficult to use common encode conditions of the images.

In this embodiment, assume that image data of various encode conditions are held on the server side. Assume that the arrangements of the server and client and that of the server/client system in the third embodiment are the same as those in the first and second embodiments shown in FIGS. 1 and 2.

In this embodiment, the server 204 calculates an occupation ratio pct of the displayed area to the entire image on the basis of the request from the client, and compares the calculated ratio pct with a predetermined threshold Th as in the first and second embodiments. As a result, if the value of the ratio pct is larger than the threshold Th, i.e., if the occupation ratio of the displayed area to the entire image is larger, the image is divided into tiles less than the predetermined number N of times. On the other hand, if the value of the ratio pct is smaller than the threshold Th, i.e., if the occupation ratio of the displayed area to the entire image is smaller, the image is divided into tiles equal to or more than the predetermined number N of tiles. Note that the predetermined number N of tiles is 400 in this embodiment.

Figure 17:
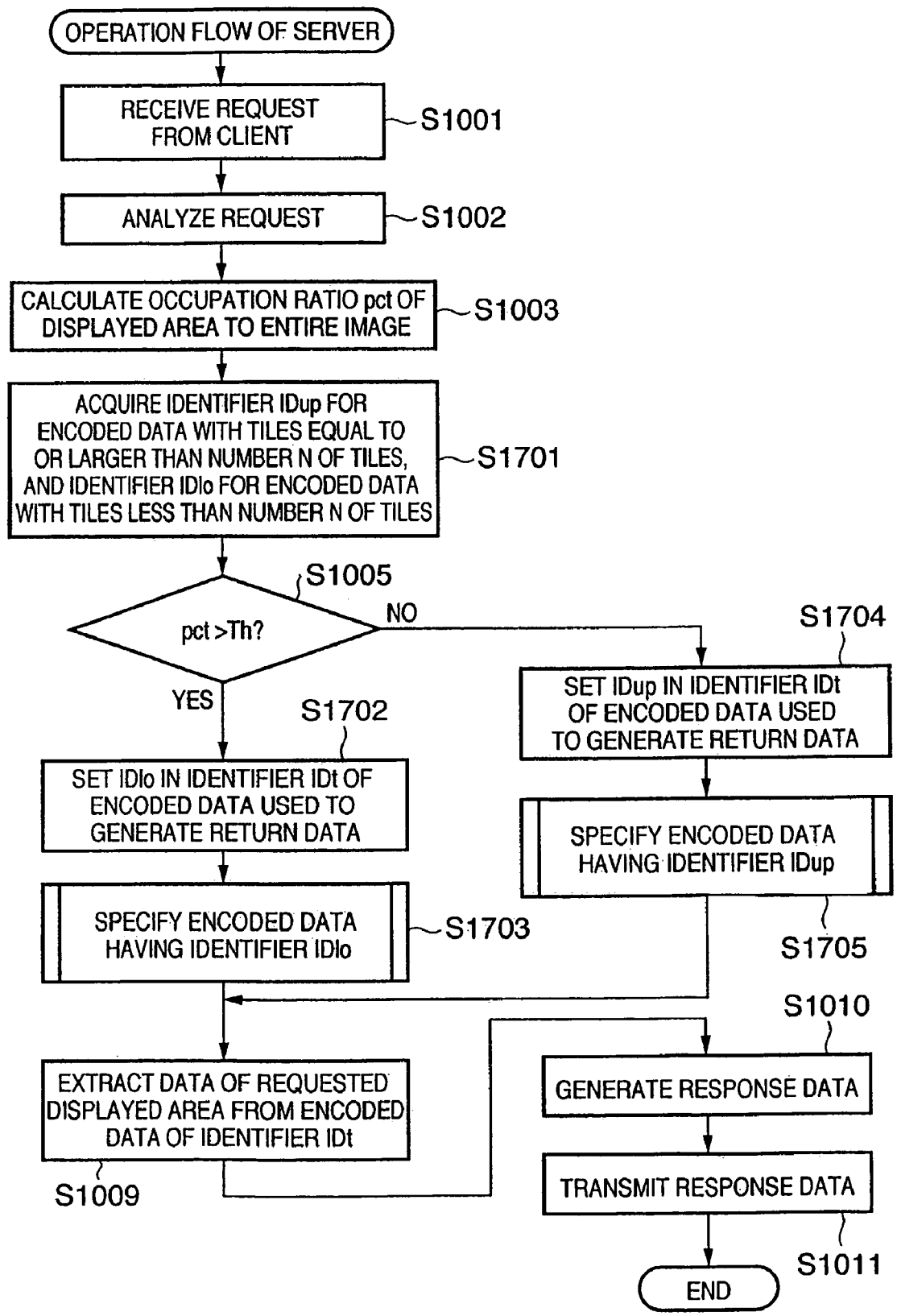
FIG. 17 is a flowchart for explaining the operation of the server 204 according to the third embodiment of the present invention.

When processing is done under such conditions, the processing different from the first and second embodiments described above is that on the server 204 side, i.e., the processing contents and sequence in steps S1004 to S1008 in FIG. 10. FIG. 17 is a flowchart for explaining the operation of the server 204 according to the third embodiment of the present invention. Note that the same step numbers as in FIG. 10 in the flowchart shown in FIG. 17 denote the same operations as in the flowchart shown in FIG. 10 described in the first embodiment, and a detailed description thereof will be omitted.

The server 204 according to the third embodiment receives a request from the client (step S1001), analyzes the request (step S1002), and calculates the occupation ratio pct of the displayed area to the entire image (step S1003) as in the first embodiment.

Next, the server 204 acquires an identifier IDup for encoded data with tiles equal to or larger than the number N of tiles, and an identifier IDlo for encoded data with tiles less than the number N of tiles (step S1701). In this embodiment, assume that an identifier "sample_upper" can be acquired for encoded data with 400 or more tiles, and an identifier "sample_lower" can be acquired for encoded data with less than 400 tiles.

The server 204 then checks if the occupation ratio pct of the displayed area to the entire image is larger than a predetermined threshold Th (step S1005). As a result, if it is determined that the ratio pct is larger than the threshold Th (Yes), the server 204 sets IDlo in an identifier IDt of encoded data used to generate return data (step S1702). Note that IDt=sample_lower in this embodiment.

The server 204 specifies encoded data having the identifier IDlo (step S1703), and the flow advances to step S1009. Note that details of the operation in step S1703 will be described later using FIG. 18.

On the other hand, if it is determined in step S1005 that the occupation ratio pct of the displayed area to the entire image is smaller than the predetermined threshold Th (No), the server 204 sets IDup in the identifier IDt of encoded data used to generate return data (step S1704). Note that IDt=sample_upper in this embodiment. Next, the server 204 specifies encoded data having the identifier IDup (step S1705), and the flow advances to step S1009. Note that details of the operation in step S1705 will be described later using FIG. 19.

After the processes in steps S1703 and S1705, the server 204 extracts data of the requested displayed area from the encoded data with the identifier IDt (step S1009), generates response data (step S1010), and transmits the response data (step S1011) as in the first embodiment.

Figure 18:
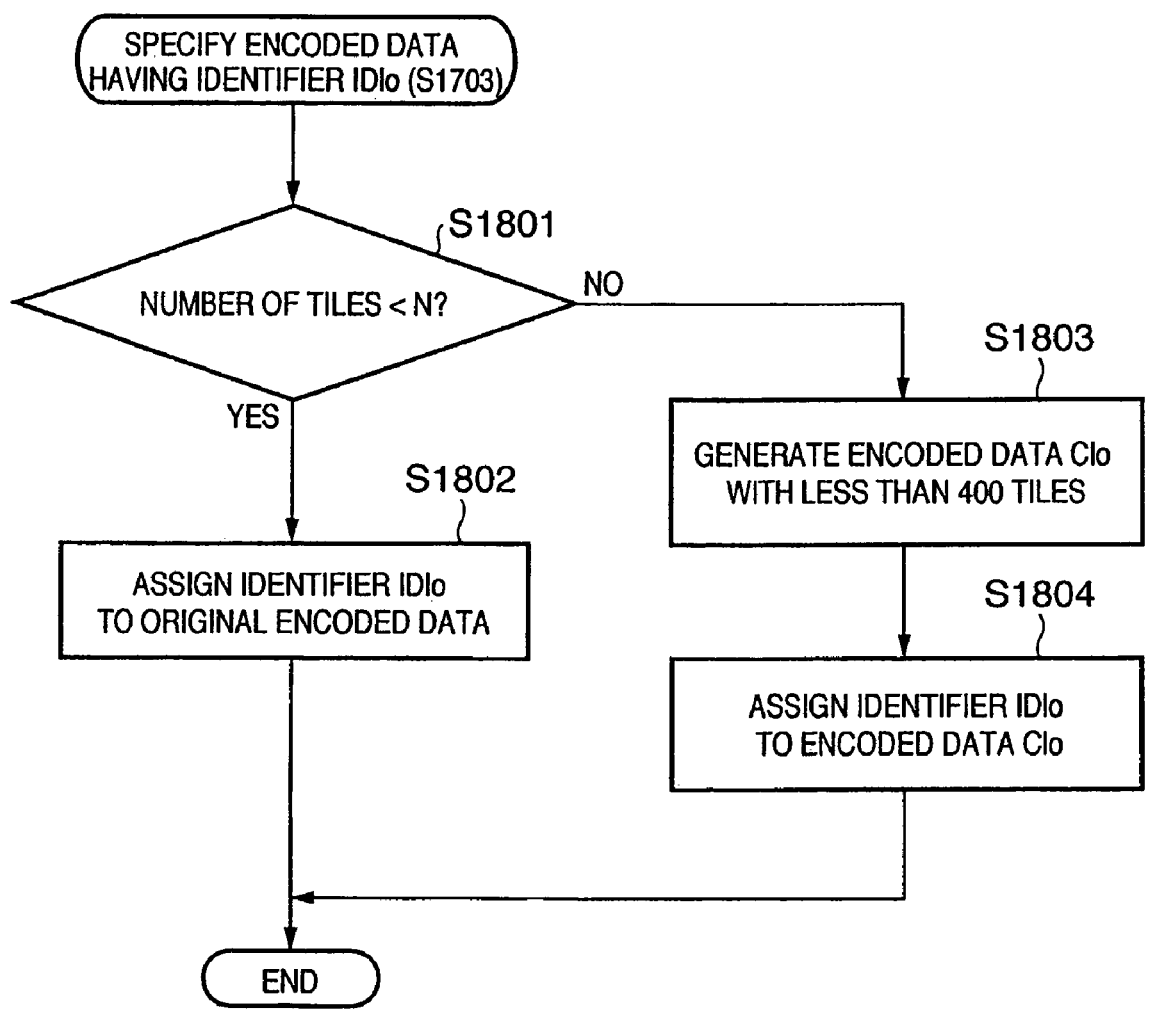
FIG. 18 is a flowchart for explaining the detailed processing sequence of processing (step S1703) for specifying encoded data having an identifier IDlo of the server 204 in the third embodiment.

FIG. 18 is a flowchart showing the detailed processing sequence of the processing (step S1703) for specifying encoded data having the identifier IDlo by the server 204 in the third embodiment. The server 204 compares the number of tiles of original encoded data with the predetermined number N of tiles (step S1801). As a result, if the number of tiles of the original encoded data is smaller (Yes), the flow advances to step S1802; otherwise (No), the flow advances to step S1803. Since the predetermined number N of tiles is 400 in this embodiment, if image data is like the image 901 in FIG. 9, the flow advances to step S1803, or if image data is like the image 902 in FIG. 9, the flow advances to step S1802.

In step S1802, the server 204 assigns the identifier IDlo to the original encoded data to end this flow, and the flow advances to step S1009. On the other hand, the server 204 generates encoded data Clo with tiles less than the number N of tiles from the original encoded data in step S1803. In this embodiment, since the number N of tiles is 400, if the data is like the image 901 in FIG. 9, the number of tiles can be reduced to less than 400 by generating one tile from four tiles as in the first embodiment. The server 204 assigns the identifier IDlo to the encoded data Clo generated in step S1803 (step S1804) to end this flow, and the flow advances to step S1009.

Figure 19:
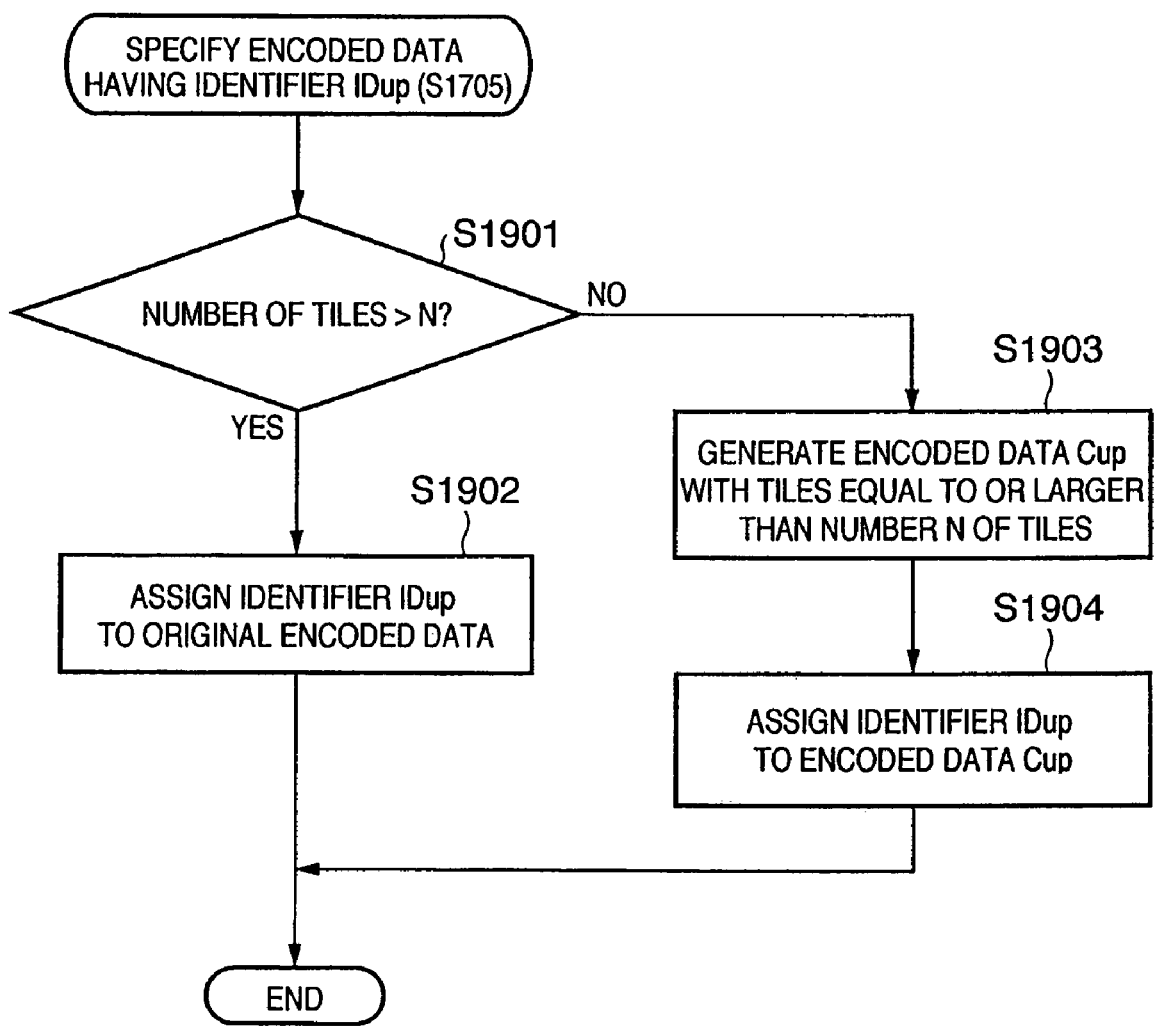
FIG. 19 is a flowchart for explaining the detailed processing sequence of processing (step S1705) for specifying encoded data having an identifier IDup of the server 204 in the third embodiment.

FIG. 19 is a flowchart showing the detailed processing sequence of the processing (step S1705) for specifying encoded data having the identifier IDup by the server 204 in the third embodiment. The server 204 compares the number of tiles of original encoded data with the predetermined number N of tiles (step S1901). As a result, if the number of tiles of the original encoded data is larger (Yes), the flow advances to step S1902; otherwise (No), the flow advances to step S1903. Since the predetermined number N of tiles is 400 in this embodiment, if image data is like the image 901 in FIG. 9, the flow advances to step S1902, or if image data is like the image 902 in FIG. 9, the flow advances to step S1903.

In step S1902, the server 204 assigns the identifier IDup to the original encoded data to end this flow, and the flow advances to step S1009. On the other hand, the server 204 generates encoded data Cup with tiles equal to larger than the number N of tiles from the original encoded data in step S1903. In this embodiment, since the number N of tiles is 400, if the data is like the image 902 in FIG. 9, the number of tiles can be increased to 400 or more by generating four tiles from one tile as in the second embodiment.

After that, the server 204 assigns the identifier IDup to the encoded data Cup generated in step S1903 (step S1904) to end this flow, and the flow advances to step S1009.

Using the method described in the third embodiment, the conditional branch steps and the like increase. On the other hand, although the load on the server becomes heavier slightly, when image data having various encode conditions are added to the server, the same effects as in the first and second embodiments can be obtained. That is, when a relatively small image is to be displayed, since JPEG2000 encoded data generated on the client side has a small number of tiles, the number of times of file seek operations is reduced, and the time required until display can be effectively shortened. On the other hand, when a large image is to be partially displayed, the transfer data volume is reduced since image data is formed of tiles with a small size, and the communication time can be effectively shortened.

Other Embodiments

In the first, second, and third embodiments, a packet of JPEG2000 is used as a data transfer unit between the server and client. However, the same effects can be obtained if a tile is used as the data transfer unit.

In the description of the above embodiments, as a threshold used to determine to increase or decrease the number of tiles, 25% as ¼ of the entire image are selected. However, the present invention is not limited to this value. The number of thresholds is not limited to one. For example, three or more encoded data with the different numbers of tiles may be generated from one image data, and may be compared with a plurality of thresholds.

Furthermore, in the above embodiments, as a method of describing the correspondence between the threshold and codestream identifier, a description method:

codeselect: [ratio of displayed area to entire image]/[codestream identifier] may be used.

That is, to request return of data from a codestream of an identifier "sample_master_704" if the ratio of the displayed area to the entire image is 25% or less, from a codestream of an identifier "sample_derive_204" if the ratio falls within the range from 25% to 50%, from a codestream of an identifier "sample_derive_48" if the ratio falls within the range from 50% to 75%, and from a codestream of an identifier "sample_derive_12" if the ratio falls within the range from 75% to 100%, the following description is made:

codeselect: 0-25/sample_master_704
codeselect: 25-50/sample_derive_204
codeselect: 50-75/sample_derive_48
codeselect: 75-100/sample_derive_12

As the method of reducing the number of tiles, in the above embodiments, the number of tiles is reduced to about ¼ by generating one tile from four tiles. In addition, using neighboring six tiles, nine tiles, 16 tiles, or the like, the number of tiles may be reduced to about ⅙, about ⅑, or about 1/16.

Furthermore, if the threshold value is determined in advance between the server and client, the server need not notify the client of the threshold together with the return data.

Moreover, in the above embodiments, the number of tiles is increased/decreased in every case, and the number of tiles is used as a reference. Alternatively, even if the codestream is generated using the tile size as a reference, the same effects can be obtained. For example, if the ratio of the requested area is 25% or more, a codestream is converted to have a tile size of 256×256 pixels or more at the highest resolution; if the ratio is 25% or less, a codestream is converted to have a tile size of 128×128 pixels or less. In this case as well, the method of increasing the tile size by generating one tile from neighboring four tiles, or decreasing the tile size by dividing one tile into nine tiles is effective.

In addition, when the tile size is used as a reference value, the tile size as a reference may be determined in accordance with the requested area size of the client. For example, if the ratio of the requested area is 25% or less, the tile size is changed to 1/16 of the requested area size.

Using the present invention which can be exemplified by the aforementioned embodiments, when an image of a low resolution is to be displayed, data is returned from image data with a small number of tiles. Hence, the number of times of file seek operations is reduced, and high-speed decoding can be achieved when the entire image is displayed using a small size such as thumbnail display or the like. On the other hand, since an image of a high resolution which is returned in response to an enlargement request has a large number of tiles, the tiles included in the partial area of the image have a small size, and wasteful data transfer can be suppressed while maintaining random accessibility.

Therefore, the decode time can be shortened using data with a small number of tiles for an image of a low resolution (small image size). Upon transferring a partial area of an enlarged image, data with a large number of tiles is used to reduce a wasteful data transfer volume.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

In each of the above embodiments, the ratio of the requested area is calculated. However, the present invention is not limited to this. For example, assuming that the size of the entire image is a size within a common-sense range, only the size of the requested area may be detected. In this case, the requested area size is compared with a predetermined threshold to determine if that area is large or small. If the area is large, the same processing as in a case the high ratio is applied; otherwise, the same processing as in a case of the low ratio is applied. In this way, the same effects as those obtained when the ratio is calculated can be obtained.

According to the present invention, a required partial image can be suitably accessed, and wasteful data transfer can be suppressed.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-381469 filed on Dec. 28, 2004, which is hereby incorporated by reference herein.

What is claimed is:

1. An image processing method comprising:
calculating an occupation ratio of a partial area of an image to an entire area of the image;
transmitting encoded data, wherein the encoded data was encoded by dividing the image into a plurality of tiles;
wherein the transmitting includes:
    transmitting, when the occupation ratio is not more than a predetermined value, encoded data corresponding to the partial area of the image in encoded data obtained by dividing the image to have a first number of tiles; and
    transmitting, when the occupation ratio is not less than the predetermined value, encoded data corresponding to the partial area of the image in encoded data obtained by dividing the image to have a second number of tiles smaller than the first number of tiles; and
wherein at least one of the above steps is implemented by at least one processor.

2. A computer-readable storage medium having stored thereon sequences of instructions, the sequences of instructions including instructions which when executed by a computer system causes the computer system to perform the image processing method of claim 1.

3. An image processing method in a server/client system in which a server fragmentarily transmits encoded data which is hierarchically encoded by dividing an image into a plurality of tiles in response to a request from a client, the method comprising:
receiving a request to display a partial area of the image requested from the client;
calculating an occupation ratio of a displayed area of the image requested from the client to an entire area of the image;
generating second encoded data which is hierarchically encoded by dividing the image to have a second number of tiles, and has a different number of divided tiles from first encoded data which is held by the server and is hierarchically encoded by dividing the image to have a first number of tiles;
selecting, when the occupation ratio is not more than a predetermined value, encoded data encoded by dividing the image to have a larger number of tiles of the first and second encoded data, and selecting, when the occupation ratio is not less than the predetermined value, encoded data encoded by dividing the image to have a smaller number of tiles of the first and second encoded data;
extracting encoded data corresponding to the displayed area from the selected encoded data;
transmitting, via at least one processor, the extracted encoded data to the client; and
wherein at least one of the above steps is implemented by at least one processor.

4. The method according to claim 3, further comprising:
transmitting the request to display a predetermined area of the image to the server;
receiving the encoded data which is transmitted from the server and corresponds to the displayed area; and
decoding and displaying the encoded data.

5. The method according to claim 3 further comprising notifying the client of the predetermined value used upon selecting the encoded data in the selection step.

6. The method according to claim 3 further comprising generating the second encoded data which is hierarchically encoded by dividing the image to have the second number of tiles smaller than the first number of tiles, by re-encoding the first encoded data which is held by the server and is hierarchically encoded by dividing the image to have the first number of tiles, by generating one tile from a plurality of neighboring tiles.

7. The method according to clam 6 further comprising selecting the first encoded data when the occupation ratio is not more than the predetermined value, and selecting the second encoded data when the occupation ratio is not less than the predetermined value.

8. The method according to claim 3 further comprising generating the second encoded data which is hierarchically encoded by dividing the image to have the second number of tiles larger than the first number of tiles, by re-encoding the first encoded data which is held by the server and is hierarchically encoded by dividing the image to have the first number of tiles, by dividing each tile of the first encoded data into a plurality of tiles.

9. The method according to clam 8 further comprising selecting the second encoded data when the occupation ratio is not more than the predetermined value, and selecting the first encoded data when the occupation ratio is not less than the predetermined value.

10. The method according to claim 3, wherein the client requests the server as the request to transmit encoded data which is not saved in the client.

11. The method according to claim 3, wherein the encoded data is data encoded based on a JPEG2000 encoding scheme.

12. The method according to claim 3, wherein the encoded data which is fragmentarily transmitted from the server to the client is transmitted for respective packets in a JPEG2000 encoding scheme.

13. The method according to claim 3, wherein the encoded data which is fragmentarily transmitted from the server to the client is transmitted for respective tiles in a JPEG2000 encoding scheme.

14. The method according to claim 3, wherein JPIP is used as a request and response upon transmitting/receiving the encoded data.

15. A computer-readable storage medium having stored thereon sequences of instructions, the sequences of instructions including instructions which when executed by a computer system causes the computer system to perform the image processing method of claim 3.

16. An image processing apparatus comprising:
calculation means for calculating an occupation ratio of a partial area of an image to an entire area of the image; and
transmission means for transmitting encoded data, wherein the encoded data was encoded by dividing the image into a plurality of tiles;
wherein when the occupation ratio is not more than a predetermined value, said transmission means transmits encoded data corresponding to the partial area of the image in encoded data obtained by dividing the image to have a first number of tiles; and
when the occupation ratio is not less than the predetermined value, said transmission means transmits encoded data corresponding to the partial area of the image in encoded data obtained by dividing the image to have a second number of tiles smaller than the first number of tiles.

17. An image processing apparatus which fragmentarily transmits encoded data which is hierarchically encoded by dividing an image into a plurality of tiles in response to a request from another apparatus, comprising:
reception means for receiving a request to display a partial area of the image requested from the other apparatus;
analysis means for analyzing the received request;
calculation means for calculating an occupation ratio of a displayed area of the image requested from the other apparatus to an entire area of the image on the basis of the analysis result of the request;
holding means for holding first encoded data which is hierarchically encoded by dividing the image to have a first number of tiles;
generation means for generating second encoded data which is hierarchically encoded by dividing the image to have a second number of tiles different from the number of divided tiles of the first encoded data;
selection means for, when the occupation ratio is not more than a predetermined value, selecting encoded data encoded by dividing the image to have a larger number of tiles of the first and second encoded data, and for, when the occupation ratio is not less than the predetermined value, selecting encoded data encoded by dividing the image to have a smaller number of tiles of the first and second encoded data;
extraction means for extracting encoded data corresponding to the displayed area from the selected encoded data; and
transmission means for transmitting the extracted encoded data to the other apparatus.

* * * * *